(12) United States Patent
Medalion et al.

(10) Patent No.: US 11,978,456 B2
(45) Date of Patent: May 7, 2024

(54) SYSTEM, METHOD AND PROGRAMMED PRODUCT FOR UNIQUELY IDENTIFYING PARTICIPANTS IN A RECORDED STREAMING TELECONFERENCE

(71) Applicant: GONG.IO LTD, Ramat Gan (IL)

(72) Inventors: Shlomi Medalion, Ramat Gan (IL); Omri Allouche, Tel Aviv (IL); Maxim Bulanov, Ramat Gan (IL)

(73) Assignee: GONG.IO LTD, Ramat Gan (IL)

( * ) Notice: Subject to any disclaimer, the term of this patent is extended or adjusted under 35 U.S.C. 154(b) by 36 days.

(21) Appl. No.: 17/651,208

(22) Filed: Feb. 15, 2022

(65) Prior Publication Data

US 2023/0260519 A1 Aug. 17, 2023

(51) Int. Cl.
| | |
|---|---|
| *G10L 17/06* | (2013.01) |
| *G06Q 30/01* | (2023.01) |
| *G06V 10/82* | (2022.01) |
| *G06V 20/40* | (2022.01) |
| *G06V 40/16* | (2022.01) |
| *G10L 17/02* | (2013.01) |
| *G10L 17/18* | (2013.01) |
| *G10L 21/028* | (2013.01) |
| *G10L 25/57* | (2013.01) |
| *H04L 65/403* | (2022.01) |

(52) U.S. Cl.
CPC .............. *G10L 17/06* (2013.01); *G06V 10/82* (2022.01); *G06V 20/40* (2022.01); *G06V 40/171* (2022.01); *G10L 17/02* (2013.01); *G10L 17/18* (2013.01); *G10L 21/028* (2013.01); *G10L 25/57* (2013.01); *H04L 65/403* (2013.01); *G06Q 30/01* (2013.01)

(58) Field of Classification Search
CPC ......... G10L 17/06; G10L 17/02; G10L 17/18; G10L 21/028; G10L 25/57; G06V 40/171; G06V 10/82; G06V 20/40; H04L 65/403; G06Q 30/01
See application file for complete search history.

(56) References Cited

U.S. PATENT DOCUMENTS

| | | | | |
|---|---|---|---|---|
| 6,219,639 | B1 * | 4/2001 | Bakis | G10L 17/10 |
| | | | | 382/116 |
| 9,479,736 | B1 * | 10/2016 | Karakotsios | H04N 5/265 |
| 2018/0176508 | A1 * | 6/2018 | Pell | H04L 65/403 |
| 2019/0318743 | A1 * | 10/2019 | Reshef | G10L 25/78 |
| 2022/0115019 | A1 * | 4/2022 | Bradley | G10L 15/02 |
| 2022/0189489 | A1 * | 6/2022 | Peeler | G10L 17/24 |
| 2023/0162733 | A1 * | 5/2023 | Moorsom | G10L 15/22 |
| | | | | 348/14.07 |

* cited by examiner

*Primary Examiner* — Pierre Louis Desir
*Assistant Examiner* — Daniel W Chung
(74) *Attorney, Agent, or Firm* — Amster, Rothstein & Ebenstein LLP

(57) ABSTRACT

Systems, methods and programmed products for using visual information in a video stream of a recording streaming teleconference among a plurality of participants to diarize speech, involving obtaining respective components of the teleconference including a respective audio component, a respective video component, respective teleconference metadata, and transcription data, parsing components into speech segments, tagging speech segments with source feeds, and diarizing the teleconference so as to label the speech segments based on neural network or heuristic analysis of visual information.

19 Claims, 19 Drawing Sheets

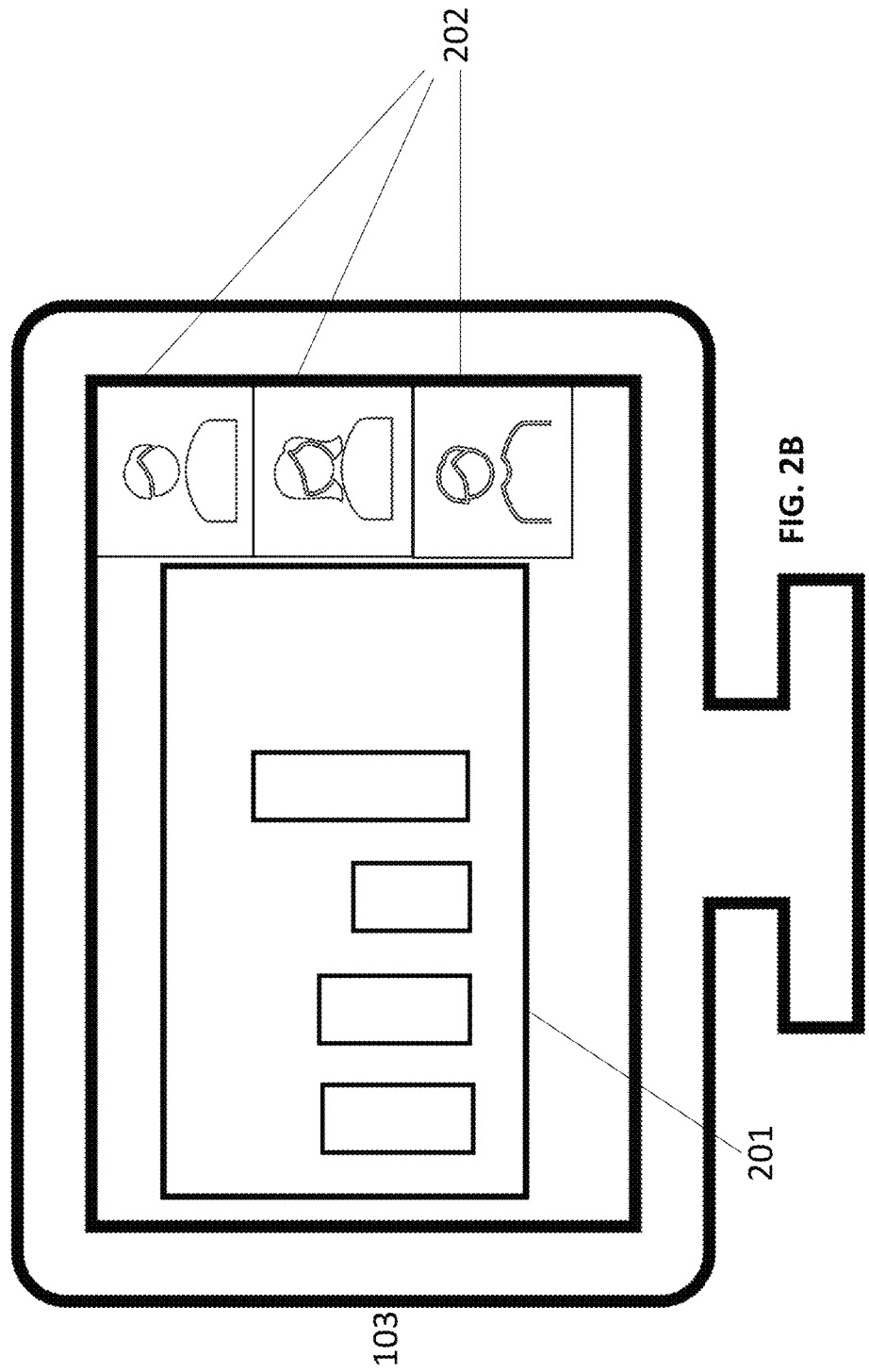

```
{"time":36.72, "type":"SpeakersSamplingEvent", "data": ("speakers":[{"name":"John Doe"}]}}
{"time":36.937, "type":"SpeakersSamplingEvent", "data": ("speakers":[{"name":"John Doe"}]}}
{"time":37.145, "type":"SpeakersSamplingEvent", "data": ("speakers":[{"name":"John Doe"}]}}
{"time":37.934, "type":"SpeakersSamplingEvent", "data": ("speakers":[]}}
{"time":38.123, "type":"SpeakersSamplingEvent", "data": ("speakers":[]}}
{"time":38.315, "type":"SpeakersSamplingEvent", "data": ("speakers":[]}}
{"time":41.556, "type":"SpeakersSamplingEvent", "data": ("speakers":[{"name":"John Doe"}]}}
{"time":41.754, "type":"SpeakersSamplingEvent", "data": ("speakers":[{"name":"John Doe"},{"name":"Janet Foe"}]}}
{"time":42.069, "type":"SpeakersSamplingEvent", "data": ("speakers":[{"name":"Janet Foe"}]}}
{"time":44.823, "type":"SpeakersSamplingEvent", "data": ("speakers":[{"name":"Janet Foe"}]}}
{"time":46.923, "type":"SpeakersSamplingEvent", "data": ("speakers":[{"name":"Janet Foe"}]}}
...
```

FIG. 3

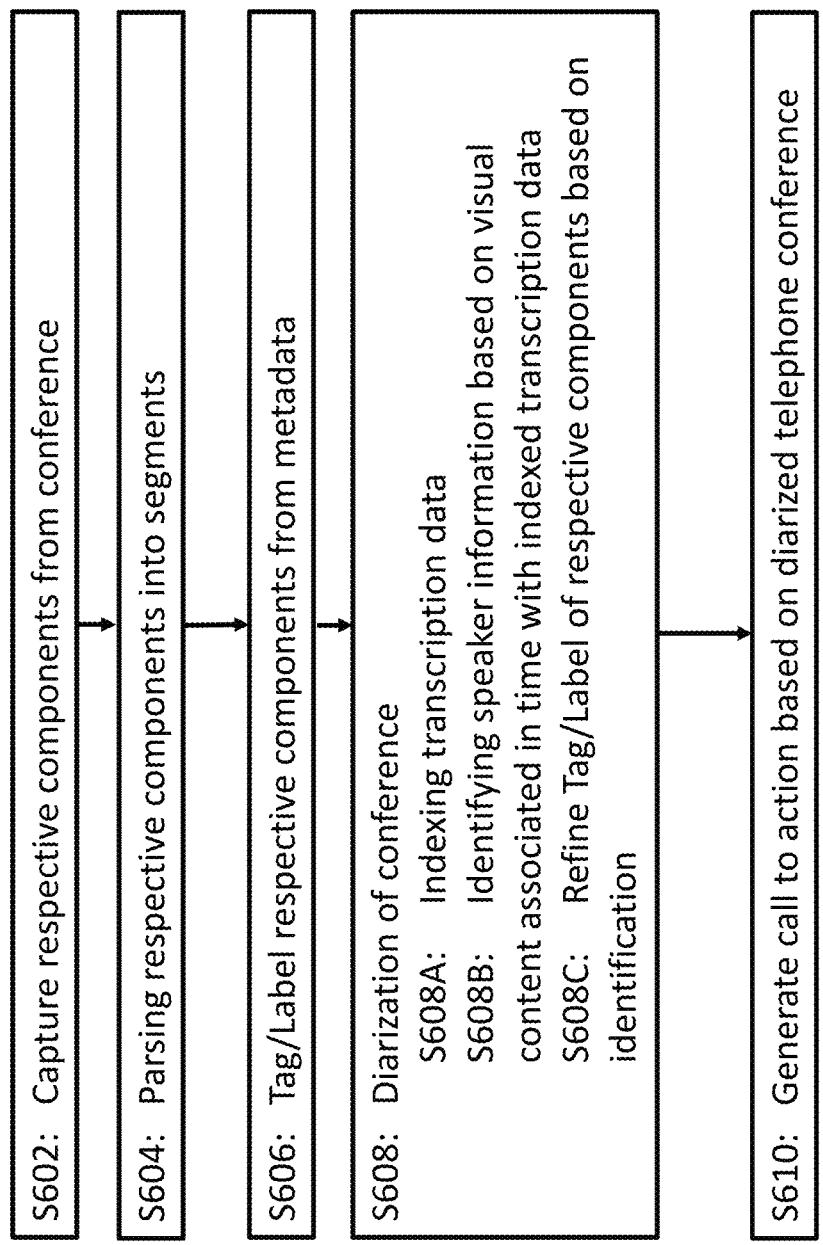

SYSTEM, METHOD AND PROGRAMMED PRODUCT FOR UNIQUELY IDENTIFYING PARTICIPANTS IN A RECORDED STREAMING TELECONFERENCE

FIELD OF THE INVENTION

The present invention relates generally to methods, apparatus, programmed products and software for speech and visual analysis, and particularly to automated diarization of conversations between multiple speakers.

BACKGROUND

Speaker diarization is the process of partitioning an audio stream containing voice data into time segments according to the identity of the speaker in each segment.

It can be combined with automatic transcription of the audio stream in order to provide a written version of the conversation during a conference, for example.

Speaker diarization is sometimes used in analyzing the sequence of speakers in a video teleconference.

Separating an audio stream into segments, each labeled with the identity of the speaker can be technically challenging in streaming audio (e.g. telephony) and audio-video teleconferences where speaker identification information may be incomplete or obscured. These challenges become more difficult when there are overlaps in speech, very short utterances, muttering, non-speech notices or other audio artifacts. Prior art solutions use coarse data collection as a method of identifying speakers, such as discussed in our prior U.S. patent application Ser. No. 16/297,757, filed on Mar. 11, 2019, and entitled "Metadata-based diarization of teleconferences" and its priority provisional Application No. 62/658,604, filed on Apr. 17, 2018, and entitled "Fine-Grained Diarization of Audio Files using Incomplete Low-Accuracy Pointers" which is incorporated by reference as set if set forth herein.

However, even these techniques are not able to consistently and fully identify speakers where information about the speaker is incomplete or obscured which results in incomplete and/or inaccurate diarization. In addition, in some conversations involving multiple parties, some participant will speak often while other will speak sparingly such that there is little speech information available to identify some parties, and such that conventional diarization approaches cannot accurately identify all speakers. Moreover, conventional techniques fail to make use of all available information in the teleconference in the identification of speakers, such as visual information, for example.

Accordingly, it would be desirable to provide systems, methods, programmed products and software that overcome these and other problems.

SUMMARY OF INVENTION

In view of the above, it is the object of the present disclosure to provide improved systems, methods, programmed products and software to overcome the technological challenges faced in conventional approaches for speech analysis, and particularly to automated diarization of conversations between multiple speakers.

There is therefore provided, in accordance with exemplary embodiments of the invention, a method for using visual information in a video stream of a first recorded teleconference among a plurality of participants to diarize speech, the method involving: (a) obtaining, by a computer system, components of the first recorded teleconference among the plurality of participants conducted over a network, the respective components including: (1) an audio component including utterances of respective participants that spoke during the first recorded teleconference; (2) a video component including a video feed as to respective participants that spoke during the first recorded teleconference; (3) teleconference metadata associated with the first recorded teleconference and including a first plurality of timestamp information and respective speaker identification information associated with each respective timestamp information; (4) transcription data associated with the first recorded teleconference, the transcription data being indexed by timestamps; (b) parsing, by the computer system, the audio component into a plurality of speech segments in which one or more participants were speaking during the first recorded teleconference, each respective speech segment being associated with a respective time segment including a start timestamp indicating a first time in the first recorded telephone conference when the respective speech segment begins, and a stop timestamp associated with a second time in the first recorded telephone conference when the respective speech segment ends; (c) tagging, by the computer system, each respective speech segment with the respective speaker identification information based on the teleconference metadata associated with the respective time segment; and (d) diarizing the first recorded teleconference, by the computer system, in a process involving: (1) indexing, by the computer system, the transcription data in accordance with respective speech segments and the respective speaker identification information to generate a segmented transcription data set for the first recorded teleconference; (2) identifying, by the computer system, respective speaker information associated with respective speech segments using a neural network with at least a portion of the video feed corresponding in time to at least a portion of the segmented transcription data set determined according to the indexing as an input, and providing source indication information for each respective speech segment as an output and using a training set including visual content tagged with prior source indication information; and (3) labeling, by the computer system, each respective speech segment based on the identified respective speaker information associated with the respective speech segment wherein the identified respective speaker information is based on the source identification information.

There is therefore further provided, in accordance with exemplary embodiments of the invention, a method for using video content of a video stream of a first recorded teleconference among a plurality of participants to diarize speech, the method involving: (a) obtaining, by a computer system, components of the first recorded teleconference among the plurality of participants conducted over a network, the respective components including: (1) an audio component including utterances of respective participants that spoke during the first recorded teleconference; (2) a video component including a video feed including video of respective participants that spoke during the first recorded teleconference; (3) teleconference metadata associated with the first recorded teleconference and including a first plurality of timestamp information and respective speaker identification information associated with each respective timestamp information; (4) transcription data associated with the first recorded teleconference, the transcription data being indexed by timestamps; (b) parsing, by the computer system, the audio component into a plurality of speech segments in which one or more participants were speaking during the first recorded teleconference, each respective speech segment being associated with a respective time segment including a start timestamp indicating a first time in the first recorded telephone conference when the respective speech segment begins, and a stop timestamp associated with a second time in the first recorded telephone conference when the respective speech segment ends; (c) tagging, by the computer system, each respective speech segment with the respective speaker identification information based on the teleconference metadata associated with the respective time segment; and (d) diarizing the first recorded teleconference, by the computer system, in a process involving: (1) indexing, by the computer system, the transcription data in accordance with respective speech segments and the respective speaker identification information to generate a segmented transcription data set for the first recorded teleconference; (2) identifying, by the computer system, respective speaker information associated with respective speech segments using a neural network with at least a portion of the video feed including video of at least one participant among the respective participants corresponding in time to at least a portion of the segmented transcription data set determined according to the indexing as an input, and a source indication as an output and a training set including a plurality of videos of persons tagged with indications of whether the respective persons are speaking; and (3) labeling, by the computer system, each respective speech segment based on the identified respective speaker information associated with the respective speech segment.

There is therefore further provided, in accordance with exemplary embodiments of the invention, a method for using video content of a video stream of a first recorded teleconference among a plurality of participants to diarize speech, the method involving: (a) obtaining, by a computer system, components of the first recorded teleconference among the plurality of participants conducted over a network, the respective components including: (1) an audio component including utterances of respective participants that spoke during the first recorded teleconference; (2) a video component including a video feed including video of respective participants that spoke during the first recorded teleconference; (3) teleconference metadata associated with the first recorded teleconference and including a first plurality of timestamp information and respective speaker identification information associated with each respective timestamp information; (4) transcription data associated with the first recorded teleconference, said transcription data being indexed by timestamps; (b) parsing, by the computer system, the audio component into a plurality of speech segments in which one or more participants were speaking during the first recorded teleconference, each respective speech segment being associated with a respective time segment including a start timestamp indicating a first time in the first recorded telephone conference when the respective speech segment begins, and a stop timestamp associated with a second time in the first recorded telephone conference when the respective speech segment ends; (c) tagging, by the computer system, each respective speech segment with the respective speaker identification information based on the teleconference metadata associated with the respective time segment; and (d) diarizing the first recorded teleconference, by the computer system, in a process involving: (1) indexing, by the computer system, the transcription data in accordance with respective speech segments and the respective speaker identification information to generate a segmented transcription data set for the first recorded teleconference; (2) identifying, by the computer system, respective spoken dialogue information associated with respective speech segments using a neural network with at least a portion of the video feed including video of at least one participant among the respective participants corresponding in time to at least a portion of the segmented transcription data set determined according to the indexing as an input, and spoken dialogue indication information as an output and a training set including a plurality of videos of persons tagged with indications of what spoken dialogue the respective persons are speaking; and (3) updating, by the computer system, the transcription data based on the identified respective spoken dialogue information associated with the respective speech segment.

There is therefore further provided, in accordance with exemplary embodiments of the invention, a method for using visual information in a video stream of a first recorded teleconference among a plurality of participants to diarize speech, the method involving: (a) obtaining, by a computer system, components of the first recorded teleconference among the plurality of participants conducted over a network, the respective components including: (1) an audio component including utterances of respective participants that spoke during the first recorded teleconference; (2) a video component including a video feed as to respective participants that spoke during the first recorded teleconference; (3) teleconference metadata associated with the first recorded teleconference and including a first plurality of timestamp information and respective speaker identification information associated with each respective timestamp information; (4) transcription data associated with the first recorded teleconference, the transcription data being indexed by timestamps; (b) parsing, by the computer system, the audio component into a plurality of speech segments in which one or more participants were speaking during the first recorded teleconference, each respective speech segment being associated with a respective time segment including a start timestamp indicating a first time in the first recorded telephone conference when the respective speech segment begins, and a stop timestamp associated with a second time in the first recorded telephone conference when the respective speech segment ends; (c) tagging, by the computer system, each respective speech segment with the respective speaker identification information based on the teleconference metadata associated with the respective time segment; and (d) diarizing the first recorded teleconference, by the computer system, in a process involving: (1) indexing, by the computer system, the transcription data in accordance with respective speech segments and the respective speaker identification information to generate a segmented transcription data set for the first recorded teleconference; (2) identifying, by the computer system, respective speaker information associated with respective speech segments by: (a) determining, in at least a portion of the video feed corresponding in time to at least a portion of the segmented transcription data set determined according to the indexing, a location of lips; (b) determining whether, at the determined location of lips in the least a portion of the video feed and based on comparison of two or more images separated in time, the lips are moving; (c) determining a source indication based on whether the lips are moving; and (d) identifying the respective speaker information associated with respective speech segments based on the source indication; and (3) labeling, by the computer system, each respective speech segment based on the identified respective speaker information associated with the respective speech segment.

BRIEF DESCRIPTION OF THE DRAWINGS

The above and related objects, features and advantages of the present disclosure will be more fully understood by reference to the following detailed description of the preferred, albeit illustrative, exemplary embodiments of the present invention when taken in conjunction with the accompanying figures, wherein:

FIGS. 2A-2B are exemplary views of a user device during a video conference over the internet in accordance with exemplary embodiments of the present invention;

FIG. 3 is an example of raw metadata obtained during a recorded teleconference in accordance with exemplary embodiments of the present invention;

FIG. 6 is a flow chart that schematically illustrates another method for refining the segmentation of a conversation using visual information, in accordance with embodiments of the present invention;

FIGS. 7B-7I are user interfaces containing bar charts that schematically show additional results of diarization of multiple conversations involving a group of different speakers, in accordance with embodiments of the present invention.

DETAILED DESCRIPTION OF THE EXEMPLARY EMBODIMENTS

The present invention generally relates to improved systems, methods, programmed products and software to overcome the technological challenges faced in conventional approaches for speech analysis, and particularly to automated diarization of conversations between multiple speakers.

In exemplary embodiments, the present invention improves upon prior diarization techniques to identify speakers during a recorded streaming teleconference by utilizing machine learning techniques tied to transcription data of the conversation and training sets with common utterances tagged with speaker information and/or other tagged utterances such as tagged utterance samples.

In exemplary embodiments, the present invention also improves upon prior diarization techniques to identify speakers during a recorded streaming teleconference by utilizing machine learning techniques tied to recognizing, from video data, speaker actions and correlating such speaker actions to transcription data and segmentation information, for example through identification of visual features such as a software-created visual representations that an individual on the call is speaking.

In exemplary embodiments, the present invention further improves upon prior diarization techniques to identify speakers, for example with respect to their particular statements or with respect to who is talking and who is merely making noise, where sound comes from multiple speakers (e.g. through their respective audio feeds).

System Description

Figure 1:
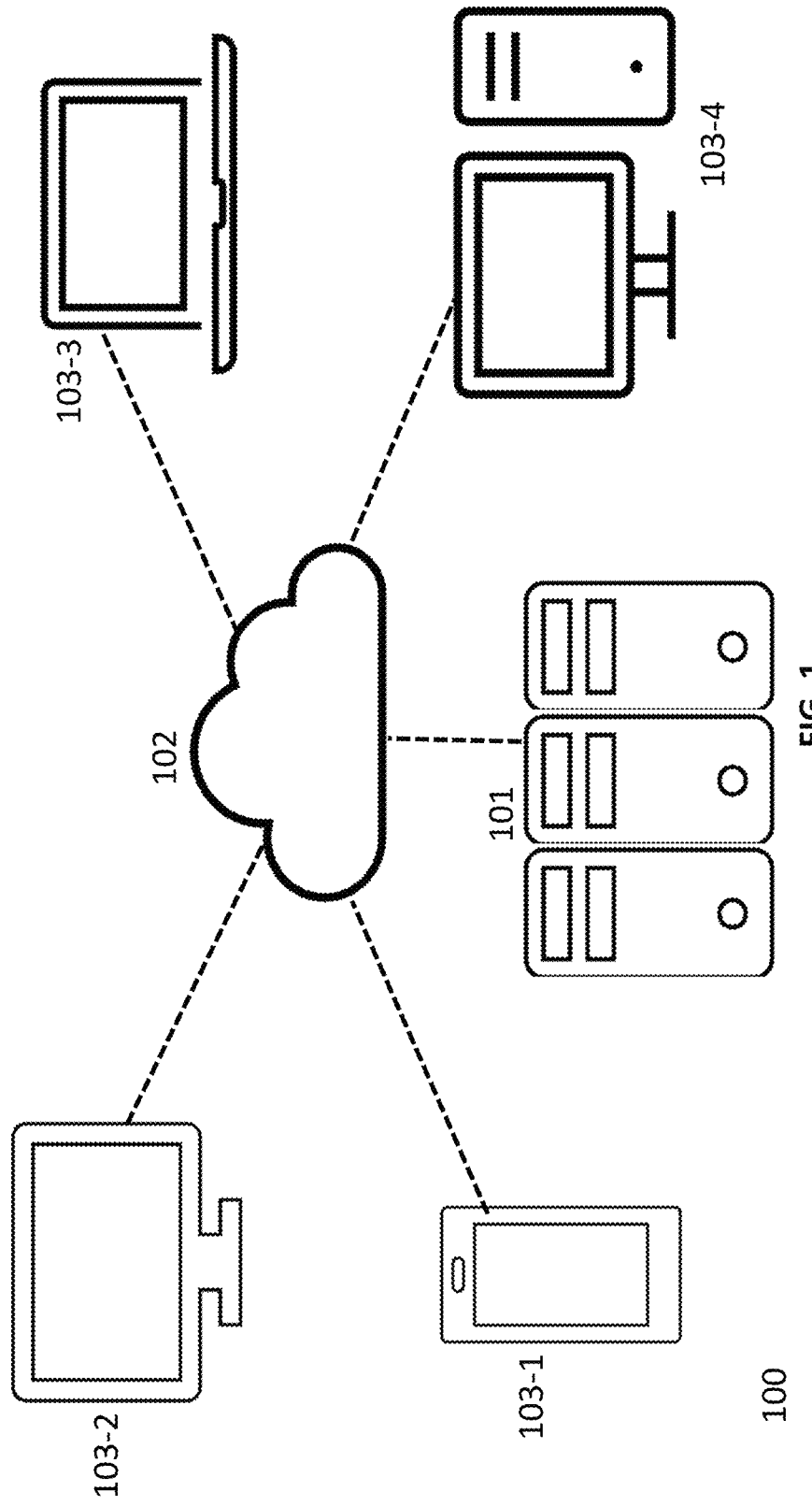
FIG. 1 is a schematic illustration of a system including a plurality of user devices participating in a video conference over the internet in accordance with exemplary embodiments of the present invention.

FIG. 1 is schematic pictorial illustration of a teleconferencing system 100, in accordance with an embodiment of the invention. A computer, such as a server (or group of servers) 101, which may be referred to herein as a computer system, receives and records conversations conducted via a network 102, among pairs or groups of participants using respective computers 103-1, 103-2, 103-3, 103-4. Network 102 may be or include any suitable data communication network, such as the Internet Computers 103-1, 103-2, 103-3, 103-4, may be any sort of computing devices with a suitable audio interface such as a microphone or other audio input and a speaker or other audio output, video interface such as an on-screen video display or other video output and a camera or other video input, including both desktop and portable devices, such a laptops, tablets and smartphones, to name a few. While four computers 103 are shown, two computers 103 may be used, or three or more computers 103 may be used, or four or more computers 103 may be used.

A data stream among computers 103-1, 103-2, 103-3, 103-4 may be recorded by server 101 includes both an audio stream, containing speech uttered by the participants, and conference metadata. The data stream may further include a video stream, containing visual recordings of the participants and/or visual information generated regarding the participants or the conversation, by way of example, symbols or shapes or lettering appearing on the screen, for example indicating a teleconferencing software's evaluation of who may be speaking. Server 101 may receive audio input as well as visual input from the conversations on-line in real time, or it may, additionally or alternatively, receive recordings made and stored by other means. The conference metadata may have the form of textual code in HTML or another markup language, for example such HTML as used for controlling the teleconference display on the video screens viewed by the participants. The conference metadata may be generated by third-party teleconferencing software, separate from and independent of server 101. As one example, server 101 may capture and collect recordings of web conferences using the methods described in U.S. Pat. No. 9,699,409, whose disclosure is incorporated herein by reference. In exemplary embodiments, the conference metadata may be generated, for example at the server 101, based on a visual indication, for example a visual indication within the recordings, pertaining to who is speaking.

Server 101 includes a processor or group of processors, such as a general-purpose computer processor or processors, which is connected to the network 102 by a network interface. Server 101 receives and stores a corpus of recorded conversations in memory operatively connected thereto, for processing by the processor(s). The processor(s) autonomously diarizes the recorded conversations, and may also transcribe the conversations and/or analyze the patterns of speech by the participants. At the conclusion of this process, the processor(s) may present the distribution of the segments of the conversations and the respective labeling of the segments according to the participant speaking in each segment over the duration of the recorded conversations on a display, which display may for example be on a computer 103 or on a different computer or device.

The processor(s) typically carries out the functions that are described herein under the control of program instructions in software. This software may be downloaded to server 101 in electronic form, for example over a network such as network 102. Additionally or alternatively, the software may be provided and/or stored on tangible, non-transitory computer-readable media, such as optical, magnetic, or electronic memory media operatively connected to the server 101.

Figure 2A:
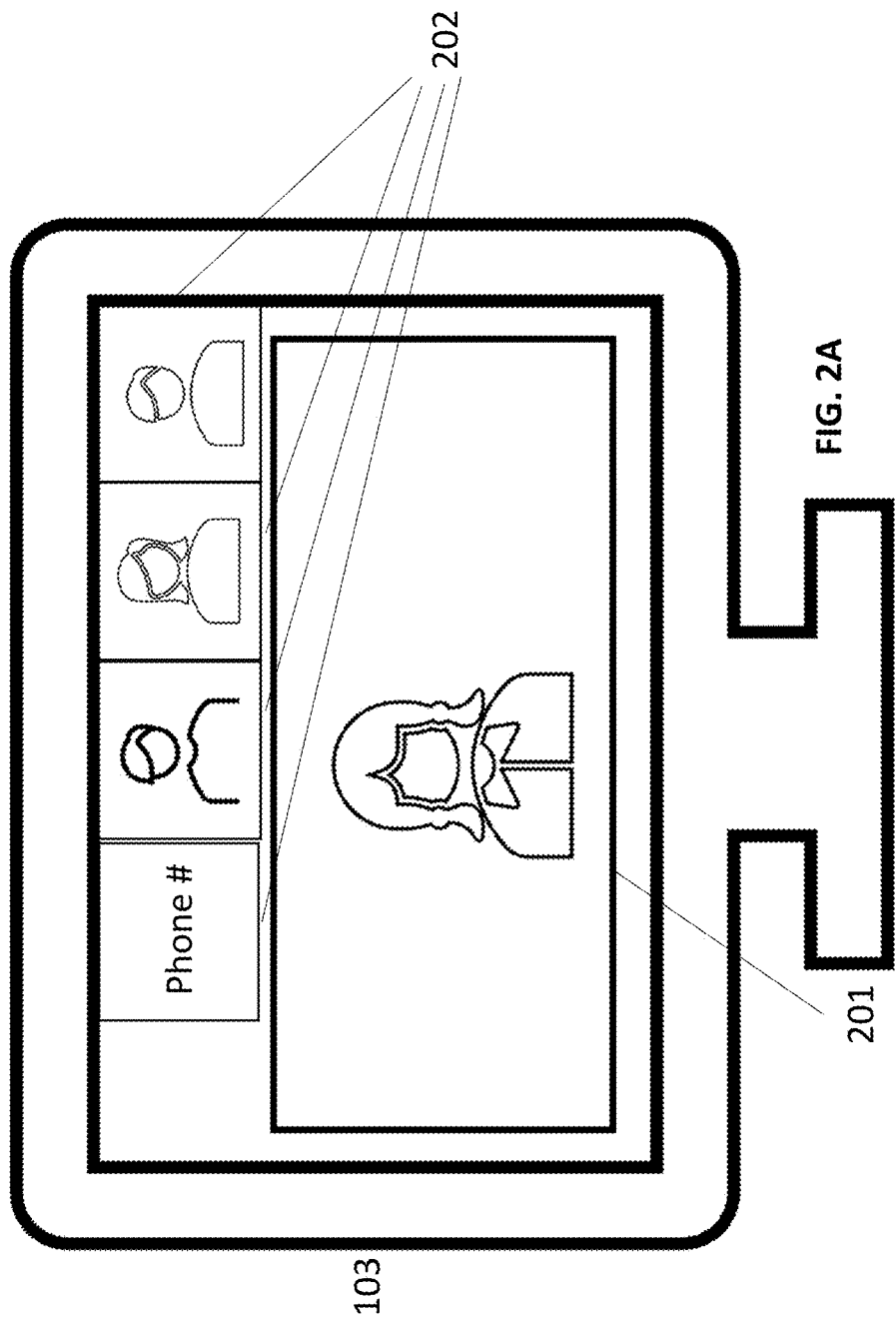

FIGS. 2A-2B are exemplary views of a user device such as a computer 103 during a video conference over the internet in accordance with exemplary embodiments of the present invention. Such computer 103 may have a screen on which may appear a main display area 201 and one or more additional display areas 202. Some of the main display area 201 and additional display areas may display live videos of participants, still photos of participants, and/or other indicia as to participants, such as a name or phone number. Such displays may for example be provided over third-party software, such as ZOOM, TEAMS, WEBEX, to name a few. Various indications may appear on the main display area 201 and additional display areas 202 that indicate that sound is coming from the associated participant, such as a colored rectangle, colored circle, or other colored shape appearing in connection, for example, in spatial association, with the display area 201, 202. It may also be seen that a participant is talking based on their physical appearance within such display area 201, 202 if video is shown. As can be seen in FIG. 2B, main display area 201 may also show a presentation, such as a presentation presented by one of the participants through a "screen-share" function.

Other orientations for the screen are possible and may be used in embodiments of the present invention. For example, in some orientations, only a single main display area 201 may be included on the screen, without the presence of additional display areas 202. The content of the main display area may provide an initial assessment, such as by a third-party system such as ZOOM, as to who a current or most recent speaker may be. The main display area 201 may also be associated with text, for example pertaining to a speaker login name or speaker phone number.

Labeling Speech Segments Using Conference Metadata

Figure 5:
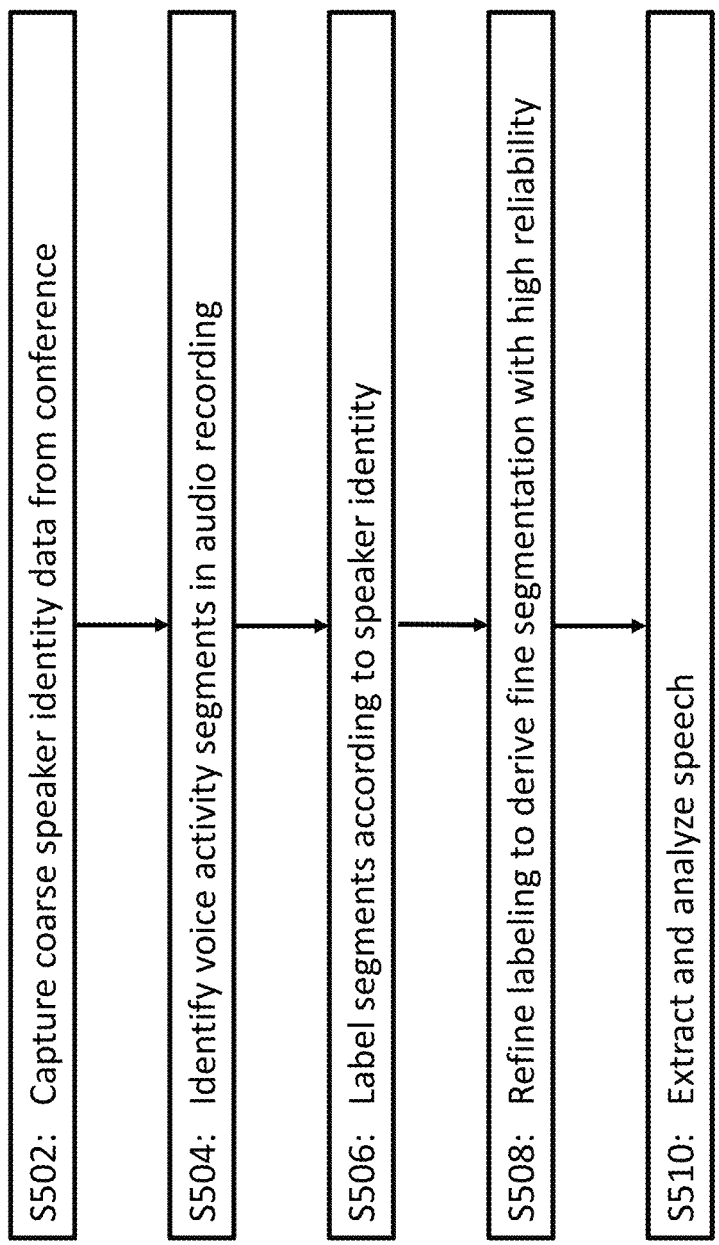
FIG. 5 is a flow chart that schematically illustrates a method for automatic analysis of a conference call based on metadata, in accordance with embodiments of the present invention.

Reference is now made to FIGS. 5 and 3A-D, which schematically illustrate a method for automatic analysis of a conference call, in accordance with an exemplary embodiment of the invention. FIG. 5 is a flow chart showing the steps of a method for coarse identification of speech segments, for example utilizing metadata, while FIGS. 3A-3D are bar plots that illustrate successive stages in segmentation of a conversation. For the sake of concreteness and clarity, the method will be described hereinbelow with reference to the processor(s) of the server 101 and the elements of system 100, and specifically to a teleconference between two participants using respective computers 103-1 and 103-2. The principles of this method, however, may be applied to larger numbers of participants and may be implemented in other sorts of Web or other network-based conferencing systems and computational configurations.

In order to begin the analysis of a conversation, in an exemplary embodiment, the processor(s) of server 101 may capture coarse speaker identity data from the conversation, and may further capture an audio stream containing speech uttered by the participants using respective computers 103-1 and 103-2, at a data capture step S502. The speaker identity data may take the form of metadata, such as HTML, which may be provided by teleconferencing software and may be transmitted over network 102. Various heuristics may be employed, for example by the teleconferencing software, in deciding on one or more speaker identities at any point in, or range in, time, and the actual method that is applied for this purpose is beyond the scope of the present description. The result is that at each of a sequence of points in time during the conversation, the metadata indicates the identity of the participant who is speaking, or may indicate that multiple participants are speaking (along with their respective identities) or that no one is speaking.

To extract the relevant metadata, the processor(s) may, in exemplary embodiments, parse the structure of Web pages' other multi-component data structures, for example which may be transmitted by the teleconferencing application. The processor(s) may then apply identification rules managed within server 101 to determine which parts of the page indicate speaker identification labels. For example, the identification rules may indicate a location of a table in the HTML hierarchy of the page, and classes or identifiers (IDs) of HTML elements may be used to traverse the HTML tree and determine the area of the page containing the speaker identification labels. Additional rules may indicate the location of specific identification labels. For example, if the relevant area of the page is implemented using an HTML table tag, individual speaker identification labels may be implemented using HTML <tr> tags. In such a case, the processor(s) may use the browser interface, for example through a document object model application program interface (DOM API), to locate the elements of interest. Alternatively, if the teleconferencing application is a native application, such as a Microsoft Windows® native application, processor(s) of server 101 may identify the elements in the application using the native API, for example the Windows API.

An extracted metadata stream of this sort, according to an exemplary embodiment, is shown in FIG. 3. Such a metadata stream may be provided, for example, through a teleconferencing service such as ZOOM, TEAMS, WEBEX, to name a few. Information provided in connection with such a metadata stream, for each entry (as illustrated for example as a row in FIG. 3), may include a time, a type indication, and an indication of a particular speaker, multiple speakers, or no speaker as assessed by the provider of the metadata, to name a few. The metadata, in exemplary embodiments, may be taken as samples, for example periodic or aperiodic samples, which may each associated with a timestamp or range of times. The metadata may also be organized into different entries taken when there is a change in state, for example when there is a change in speaker or a change from a speaker to no speaker or vice versa, to name a few. The time, in exemplary embodiments, may be indicated by a timestamp marking the beginning of each new set of speakers, whether that set of speakers may be composed of zero, one, two, or more than two speakers. The metadata may not accurately indicate who is speaking, for example, in the case where one of the participants is logged into the wrong account (such as a family member's account) or if background noise incorrectly indicates that someone is speaking when they are not.

Metadata may take other forms and be accessed in other ways. For example, file formats from which textual information may be directly accessed such as an open standard file format, e.g. JSON, may be employed where such metadata is available. As another example, the metadata file may be processed or preprocessed so as to show time ranges associated with various states.

Figure 3A:
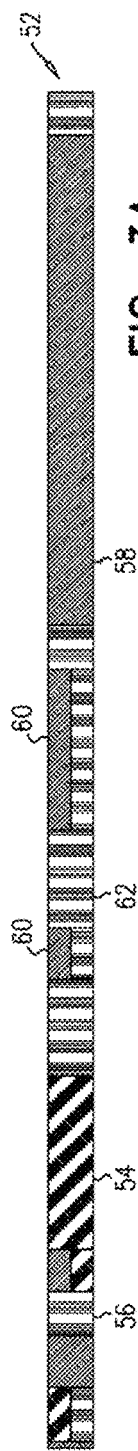
FIGS. 3A-3D are bar plots that schematically illustrate successive stages in segmentation of a conversation, in accordance with exemplary embodiments of the present invention.

The speaker identity metadata may be shown graphically as a bar plot 52 an example of which is shown in FIG. 3A, which may correspond to approximately one minute of a conference. In embodiments, such a bar plot may correspond to a longer or shorter period of time. In the exemplary bar plot 52 of FIG. 3A, movement from let to right reflects passage of time such that the approximately one minute period is covered across the length the bar. In the exemplary bar plot 52, segments 54 and 56 are identified unequivocally in the metadata as belonging to participants which are associated with computers 103-1 and 103-2, respectively, meaning that the teleconferencing software identified the participant associated with computer 103-1 as the speaker during segment 54, and the participant associated with computer 103-2 as the speaker during segment 56. In the exemplary bar plot 52, the teleconferencing software was unable to identify any speaker during a segment 58 (perhaps because both participants were silent), and therefore, no speaker is associated with this segment. Another segment 62 is also identified with the participant associated with computer 103-2, but is interrupted by two uncertain sub-segments 60, in which the metadata indicate that the identity of the speaker is unclear. In embodiments, the identity of the speaker may be unclear because of background noise or because both participants speaking at once, for example.

Figure 3B:
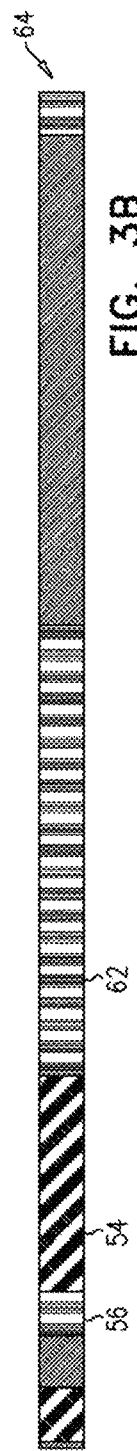

To facilitate labeling of audio segments, in exemplary embodiments the processor(s) may filter the raw metadata received from the conferencing data stream to remove ambiguities and gaps. For example, the processor(s) may merge adjacent speaker labels and close small gaps between labels FIG. 3B shows an example of the result of applying this process to the segments of FIG. 3A as a bar plot 64.

Figure 4:
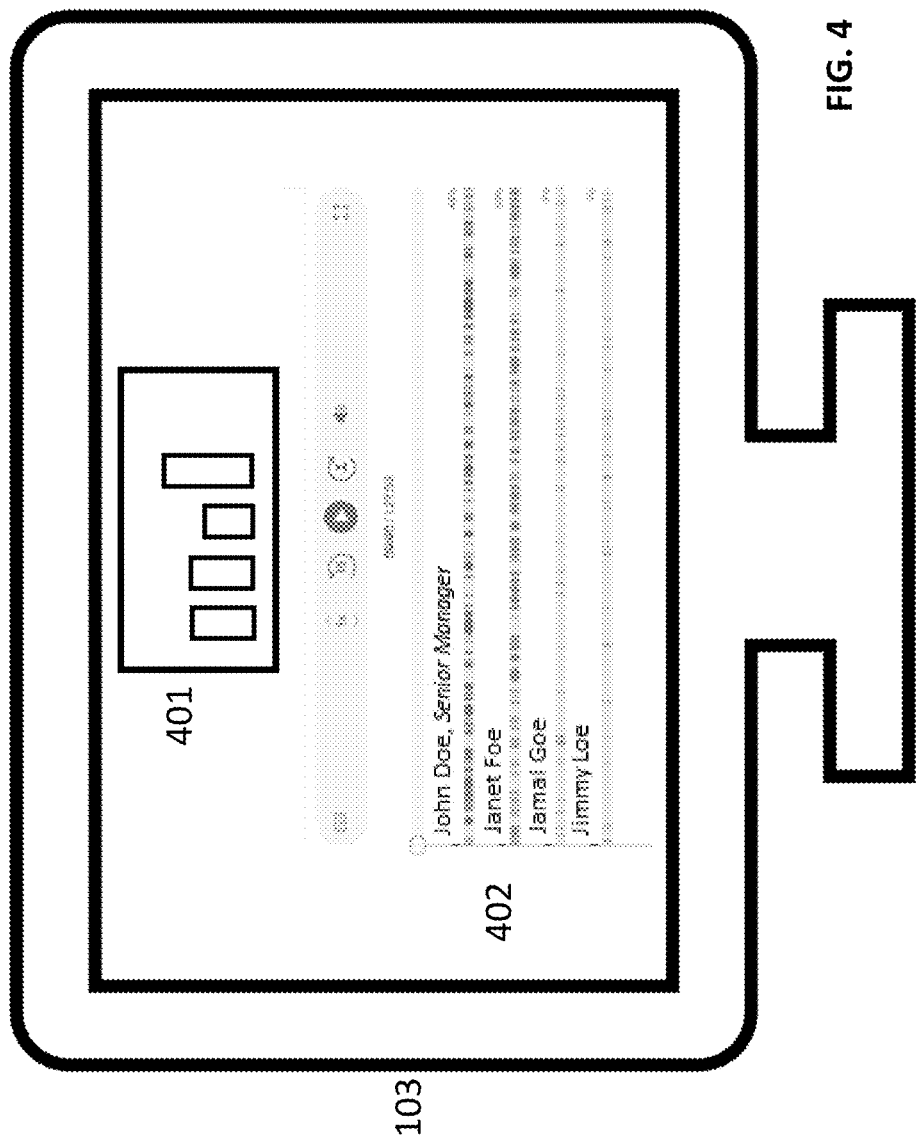
FIG. 4 is an exemplary view of a recorded video conference after diarization in accordance with exemplary embodiments of the present invention.
Figure 4A:
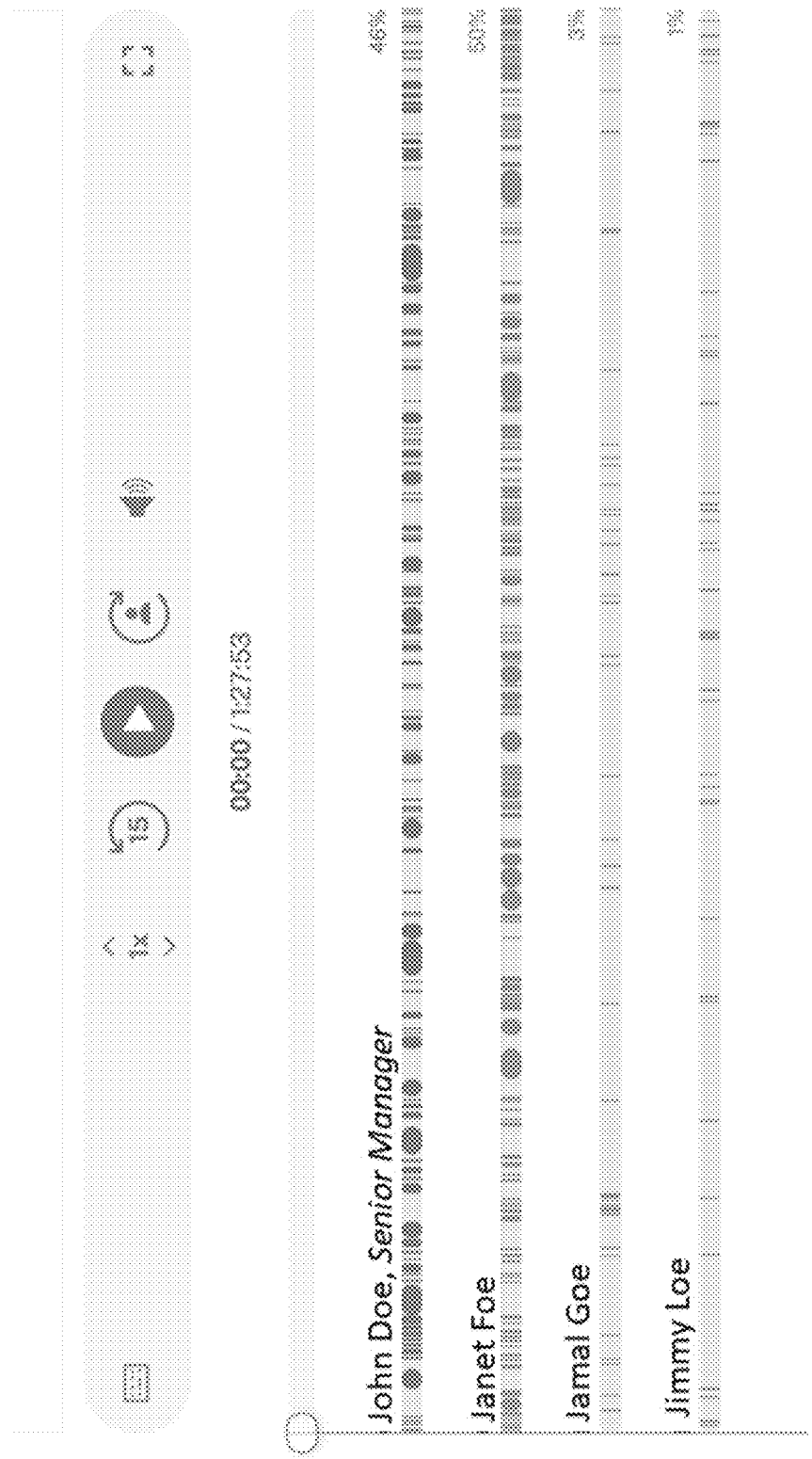
FIG. 4A is a larger view of the diarization of the recorded video in shown in FIG. 4 in accordance with exemplary embodiments of the present invention.

FIG. 4 is an exemplary view of a recorded video conference after diarization in accordance with exemplary embodiments of the present invention. According to embodiments of the present invention, a display of a computer 103 may display a presentation window 401 and a diarization time summary result display 402. FIG. 4A illustrates a close-up for this diarization time summary result display 402. The diarization time summary result display 402 may display names and titles of the participants determined by the system to have spoken based on the determinations made during the diarization process, and an indicator such as a percentage indicating the portion of the call during which the participant is understood to have spoken.

Figure 3C:
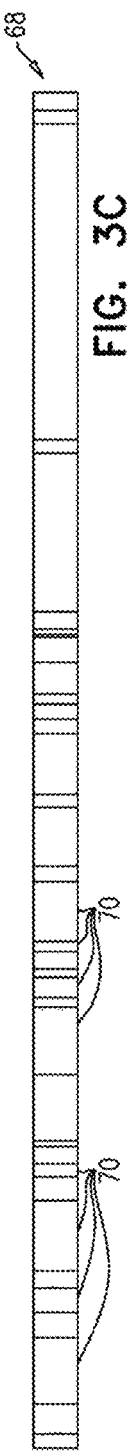

Returning now to FIG. 5, the processor(s) of server 101 may apply a voice activity detector to an audio stream containing speech and identify segments in which one of the participants was speaking, at a voice activity segment identification step S504. In embodiments, the audio stream may be the complete audio stream or a filtered or preprocessed version thereof. For example, the processor(s) of server 101 may identify as speech any segment in the audio stream in which the power of the audio signal exceeded a specified threshold. Alternately or additionally, spectral and/or temporal criteria may be applied in order to distinguish speech segments from other noise. FIG. 3C shows the result of this step as a bar plot 68, containing speech segments 70 interspersed with periods or intervals of silence and/or periods or intervals of nonspeech activity. This step does not typically identify which participant was speaking during each segment 70.

Figure 3D:
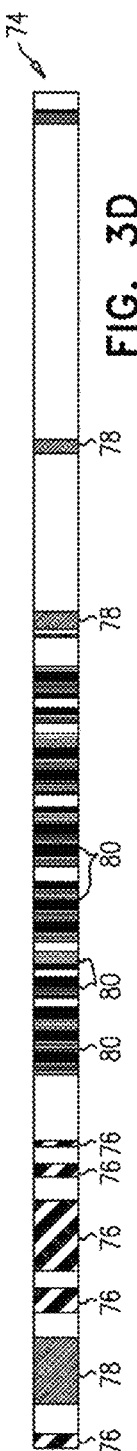

The processor(s) of server 101 may apply the speaker identity data, which may take the form of metadata or filtered metadata, extracted at step S502 to the voice activity segment-related data obtained from step S504 in labeling speech segments 70, at a segment labeling step S506. Speech segments 70 in the audio stream are labeled at step S506 when they can be mapped consistently to exactly one metadata label. FIG. 3D shows the result of this step as a bar plot 74. Segments 76 are now labeled as belonging to participant 30, while segments 80 are labeled as belonging to participant 33. The labeling of segments 78, however, remains ambiguous, because the metadata captured at step S502 did not identify the speakers during these segments Segments 78 therefore have no speaker labels at this stage.

The bar plots 52, 64, 68, 74 of FIGS. 3A-3D may further include voice activity segments that do not exactly correspond to any particular speaker. Discrepancy between the audio and metadata streams may be caused by a delay in transmission of the audio stream over network 102, relative to timestamps applied in the conference metadata, for example.

To compensate for this discrepancy, the processor(s) of server 101 may estimate the delay in network transmission between the various computers 103-1, 103-2, etc., as well as between these computers and server 101. For this purpose, for example, the processor(s) of server of 101 may transmit and receive test packets over network 102. Additionally or alternatively, the processor(s) may infer the delay by comparing the patterns of segments in bar plots 52, 64, 68, 74. In the present example, the delay is found to be about 1 second, and the processor(s) of server 101 therefore matches voice activity segment 86 to metadata segment 90.

Returning again to FIG. 5, at this point the processor(s) of server 101 will generally have labeled most of the segments of the audio stream, as illustrated by segments 76 and 80 in FIG. 3D. Some segments, however, such as segments 78, may remain unlabeled, for example because the conference metadata did not provide speaker identifications that could be matched to these latter segments unambiguously. Furthermore, short segments in which one of the participants was speaking may have been incorrectly merged at this stage with longer segments that were identified with another speaker, or may have been incorrectly labeled.

Refinement of Segmentation and Labeling

To rectify these problems and thus provide finer-grained analysis, the processor(s) of server 101 refines the initial segmentation in order to derive a finer, more reliable segmentation of the audio stream, at a refinement step S508. For this purpose, as noted earlier, the processor(s) of server 101 extracts acoustic features from the speech segments that were labeled at step S506 based on the conference metadata. The processor(s) of server 101 may apply these acoustic features in building a model, which may be optimized to maximize or increase the likelihood that each segment of the conversation will be correctly associated with a single speaker. This model may be used both in labeling the segments that could not be labeled at step S506 (such as segments 78) and in correcting the initial labeling by relabeling, splitting and/or merging the existing segments. Techniques that may be applied in implementing step S508 are described below in greater detail.

Once this refinement of the segment labeling has been completed, the processor(s) of server 101 automatically extracts and analyzes features of the participants' speech during the conference, at an analysis step S510. For example, the processor(s) of server 101 may apply the segmentation in accurately transcribing the conference, so that the full dialog is available in textual form. Additionally or alternatively, the processor(s) of server 101 may analyze the temporal patterns of interaction between the conference participants, without necessarily considering the content of the discussion.

According to exemplary embodiments, labeling or identification of speakers may be based on one or more of a variety of sources of data. For example, according to exemplary embodiments, one or more or all of visual information relating to a current telephone conference included in a recording thereof, customer relationship management (CRM) data and historical visual information, for example facial landmark information, of known speakers may be used.

In exemplary embodiments, such visual data may be used for such identification of speakers, for example according to the particular individual who is speaking. In exemplary embodiments, a lip movement or lip speech identification, accompanied by or not accompanied by a facial recognition model, may be used to differentiate speakers, for example with respect to identification of video fragments containing or associated with speech. In some embodiments, as discussed herein, lip movement or lip speech identification may be used to confirm that a speaker having a known or presumed identity (for example, based on OCR recognition, teleconference metadata, and/or a particular known location on a display) is in fact speaking and therefore associated with a particular speech segment. In embodiments, the visual information, customer relationship management (CRM) data and historical facial information of known speakers, may be used to generate a training set. In embodiments, the training set may be tagged with labels for each known speaker, for example, where particular facial landmark information is known to be associated with a particular speaker. In embodiments, the training set may be trained with an video samples of individuals speaking or not speaking, tagged as such, and a secondary analysis may be performed, as variously discussed herein (for example, based on OCR recognition, teleconference metadata, CRM data, and/or a particular known location on a display) once there is an output indicating speech, as to who is the speaker. In embodiments, such secondary analysis may be based on an image or images of the individual (for example, extracted from the teleconference video) and compared, using a neural network or heuristic matching algorithm, to a trusted source such as a photo extracted from a CRM system or a social networking site. The obtained images may be saved in the system or not saved in the system, for example according to a setting selected according to local regulatory requirements or a user company's privacy policy.

In embodiments, the training set may be provided to a machine learning algorithm. In embodiments, the training set may be used to train the machine learning algorithm to generate, as an output, an identification of a speaker, for example, based on the visual information for a current telephone conference provided as a data input, and for example according to a facial recognition model. For example, the machine learning algorithm may be trained with visual information, such as facial landmark information, known to be associated with particular speakers such machine learning algorithm may provide, as an output, the particular identity of a speaker, and/or whether or how likely the speaker matches a particular identity (for example, one associated with a CRM entry associated with an individual on or invited to the conference). In exemplary embodiments, alternately or in addition, CRM data may be included in or used to generate the training set to be provided to the machine learning algorithm, for example CRM data indicating identities (e.g. names and/or titles) of individuals on the call. For example, the CRM data used to generate the training set may indicate who was on the call. In exemplary embodiments, by determining a match with historical facial landmark information and further looking up the particular identities of the individuals on a call in a CRM system, it is possible for the system to provide an initial or final indication of which speaker determined to be speaking at a particular time has a particular identity.

In exemplary embodiments, sounds which may be determined at least in part based on movement of a speaker's lips may be compared against transcript portions potentially belonging to one of several known individuals, to determine whether the speaker of the transcript portion may match with one of those known individuals (and accordingly whether the transcript portion may be labeled accordingly). A machine learning algorithm trained with prior lip movements pertaining to such individuals and/or additional individuals, as associated with particular sounds, syllables or words, may be used for the comparison.

With reference to FIG. 6, a flow chart is shown schematically illustrating a method for refining the segmentation of a conference, and for generating a call to action based thereon, in accordance with exemplary embodiments of the invention.

At step S602, according to exemplary embodiments of the invention, respective components from or pertaining to a conference, such as a recorded streaming conference conducted over a network 102, may be captured, for example by the processor(s) of the server 101 from computers 103 through the network 102.

According to embodiments of the invention, the respective components may be taken from a recorded streaming conference, or from other forms of telephony, such as recorded telephony. The respective components may include one or more or all of a respective audio component, a respective video component, respective teleconference metadata, transcription data, and visual information, which may be included as part of or separately from the video component.

The respective audio component may include words, sounds and other utterances, and background noise associated with, respective participants that spoke during the recorded streaming teleconference, for example a plurality of respective participants making use of various computers 103 such as computers 103-1, 103-2, 103-3, and 103-4. In exemplary embodiments, the respective audio component may be in the form of a single file. This single file may include utterances, and may include other words, sounds or associated background noise, of one or more or all respective participants, for example, the respective participants that spoke during the recorded streaming teleconference. In exemplary embodiments, the respective audio component may be included in a single audio-video file or distributed amongst multiple audio-video files or a combination of audio and audio-video files In exemplary embodiments, the respective audio component may include several audio components. One or more or all of these several audio components may be associated with a separate feed during the recorded streaming teleconference. In exemplary embodiments, each separate feed may include an audio, or a combined audio-video, output of a particular sound or sound-and-video obtaining hardware or combination of such hardware, for example a microphone, multi-microphone setup, videocamera, or the like. Such hardware or combination thereof, in exemplary embodiments, may be associated with a computer 103-1, 103-2, 103-3, 103-4 of or used by a participant in the teleconference. In exemplary embodiments, a separate feed may be combined feed relating to sound or combined sound-and-video obtaining hardware for two or more or all of computers 103-1, 103-2, 103-3, 103-4. In exemplary embodiments, a separate feed may be an audio or audio-video file or stream that is sent to server 101 through network 102.

The respective video component may include a video feed of the respective participants, such as the participants who spoke during the conference or certain of the participants who spoke during the recorded streaming teleconference. In exemplary embodiments, the respective video component may be in the form of a single file. Visual information, as discussed herein, may be included as part of video feed or as a separate component. This single file may include video of one or more or all of the respective participants, for example, the respective participants that spoke during the recorded streaming teleconference. In exemplary embodiments, the respective video component may be included in a single audio-video file or distributed amongst multiple audio-video files or a combination of video and audio-video files.

In exemplary embodiments, the respective video component may include several video components. One or more or all of these several video components may be associated with a separate feed during the recorded streaming teleconference. In exemplary embodiments, each separate feed may include a video, or a combined audio-video, output of a particular video or sound-and-video obtaining hardware or combination of such hardware, for example a camera, videocamera, multi-camera setup or the like. Such hardware or combination thereof, in exemplary embodiments, may be associated with a computer 103-1, 103-2, 103-3, 103-4 of or used by a participant in the teleconference. In exemplary embodiments, a separate feed may be combined feed relating to video or combined audio-and-video obtaining hardware for two or more or all of computers 103-1, 103-2, 103-3, 103-4. In exemplary embodiments, a separate feed may be a video or audio-video file or stream that is sent to server 101 through network 102. In further exemplary embodiments, one or more or all of these video components may include a still screen identifying a respective participant. The still screen may identify or uniquely identify such respective participant from amongst the several participants, or from amongst those of the several participants who spoke during the recorded streaming teleconference.

In exemplary embodiments, the respective video component may include a streaming video showing one or more or all of the several participants, for example those that spoke during the recording streaming teleconference.

The respective teleconference metadata may be associated with the recorded streaming teleconference. In exemplary embodiments, the teleconference metadata may be indexed, for example according to times associated with the teleconference metadata. The metadata may accordingly be indexed by timestamps, for example by direct application of such timestamps or by application of one or more time periods that may be added to a known starting point in time so as to arrive at a particular associated time period. In embodiments, other forms of electronically associating an event with a time may be used.

In exemplary embodiments, the step of obtaining the respective teleconference metadata may include the metadata being generated by the computer system, e.g., at the processor(s) of the server 101. The generation of the metadata may be accomplished by the computer system, for example according to a mapping. For example, a mapping between a presumed or preliminary identity of one or more of the several participants and one or more of the participants themselves may be established.

In embodiments, the transcription data may also be associated with the recorded streaming teleconference, and may include, for example, a transcript pertaining to the teleconference. In exemplary embodiments, the transcription data may be indexed by timestamps, for example to provide an indication of what was or is understood to be said at a particular time. Indexing by timestamps may involve direct application of such timestamps or application of one or more time periods that may be added to a known starting point to arrive at a particular time associated with the transcript or a portion thereof. Other forms of electronically associating an event with a time may be used.

In exemplary embodiments, the step of obtaining the transcription data may include the transcription data being generated by the computer system, e.g., at the processor(s) of the server 101.

At step S604, according to exemplary embodiments of the invention, respective components, for example those obtained in step S602, may be parsed into segments, for example by the computer system. For example, one or more respective audio components and/or one or more of the video components or visual indicators associated with such components may be parsed into a plurality of speech segments or visual or video segments or visual or video segments associated with speech segments. These segments may be segments in which one or more participants were speaking during the teleconference. Each respective segment may be associated with a respective time segment. In exemplary embodiments, this time segment may have a start timestamp associated with the timing in the telephone conference when the segment begins, and may alternately or additionally have a stop timestamp associated with the timing in the telephone conference when the segment ends. Such timestamps may take the form of a direct indication of a time or of an interval or intervals or amount or amounts of time after a fixed reference time. Other forms of electronically associating an event or events with a time or times may be used.

In exemplary embodiments, the parsing step may include maintaining an indication of a relative ordering of chronologically adjacent speech, video or visual segments from amongst the several segments. This relative ordering may be tracked, for example by the processors of the server 101. Such tracking may advantageously allow for determinations, such as labels as are discussed herein, to be made on the basis of such relative ordering.

At step S606, according to exemplary embodiments of the invention, tagging, which may include labeling, of the respective components may occur, for example by the processors of the server 101 and for example using metadata. In exemplary embodiments, one or more or all of the respective segments may be tagged or labeled with a respective source feed for the respective audio or visual or video component. This respective audio component may be the audio component supplied by the respective speech segment, or a visual or video component, or a visual or video component associated in time therewith. The tagging or labeling, according to exemplary embodiments, may be based on the respective teleconference metadata associated with the respective time segment.

At step S608, which in exemplary embodiments may occur according to a process outlined by substeps S608A, S608B S608C, diarization of the conference may occur, for example by the computer system.

According to exemplary embodiments, at substep S608A, indexing of the transcription data may occur in accordance with one or both of respective speech segments and respective source feeds. As a result of this indexing, a segmented transcription data set for the teleconference may be generated.

Again according to exemplary embodiments, at substep S608B, which may occur after substep S608A, the step of identifying speaker information may be implemented using visual content, such as the various visual content discussed herein, associated in time with transcription data. This identification may be performed so as to identify respective speaker information, which may be associated with a respective source feed and/or speech segment. A neural network may be used for this purpose. The neural network may receive, as an input, the segmented transcription data set, or a portion thereof. This portion may be determined according to the indexing. The neural network may produce, as an output, a source indication, for example with respect to the portion of the transcription data set provided to it as the input. The neural network may be trained. In embodiments, training may be provided using a training set.

In exemplary embodiments, labeling may be achieved through analysis of visual aspects of the video components. In embodiments, lip movement or speech coming from lips may be determined based in the respective video component. In embodiments, such analysis may be used to determine a portion of a screen at which lip movement or speech is occurring, and then a secondary analysis (e.g., OCR analysis, reference to teleconference metadata, CRM lookup, and other methods as discussed herein) may be performed associating that portion of the screen with a particular speaker, so as to more accurately determine the identity of individuals who are actually moving their lips or speaking. In embodiments, other visual indicators in the respective video component may be identified in addition to or in place of lip movement or speech. In embodiments, optical character recognition (OCR) of text that appears on the screen in the video component may also be used in labeling. Analysis of a visual aspect or aspects of the video component may be particularly advantageous where no metadata pertaining to who is speaking is made available, or where such metadata cannot be fully trusted. In exemplary embodiments, one or both of labeling and parsing may be performed through visual analysis of the video component. In exemplary embodiments, for example, the system may determine a mapping between particular screens or portions of the video component and a single speaker, and may label speakers according to an identification of which particular screens or portions of the video component contain lips identified as moving. In exemplary embodiments, parsing and labeling may occur at the same time, for example during a review of the video component.

In exemplary embodiments, the parsing may identify all segments pertaining to a single source or speaker. In exemplary embodiments, the parsing may involve a parsing of segments, for example based on audio data or the audio component, and for example according to an as-yet-unidentified participant or speaker in the telephone conference. In exemplary embodiments, the parsing may further involve aggregating all segments relating to a particular (again, for example, as-yet unidentified) speaker or participant. In exemplary embodiments, this again may be performed based on audio data or the audio component. In exemplary embodiments, parsing and identification of particular speakers or classes of speakers may occur based on evaluation of the aggregation of segments. In exemplary embodiments, this may occur based on a model or special-purpose model. In exemplary embodiments, the model may be a classification model, such as a visual classification model. In exemplary embodiments, the model may be an identification of phrases within the aggregated segments known or believed to be associated with a particular speaker or kind of speaker. In exemplary embodiments, the model may be an analysis of associated customer relationship management (CRM) data, such as a role and/or name associated or determined to be associated with the aggregation of segments. In exemplary embodiments, alternatively or in addition to use of associated customer relationship management (CRM) data, analysis in the model may be of information extracted from emails, e.g. emails associated with the call or teleconference. For example, names, titles, or topics may be extracted from the message text and metadata fields (e.g. to, from, cc, and bcc fields, to name a few) and/or attached (e.g. calendar invites, to name one). In exemplary embodiments, the model may involve a combination of models, for example a combination of the above models.

In exemplary embodiments, parsing and labeling may be performed at different times and may be performed based on different components. For example, parsing, for example of segments of a teleconference, may be performed using the audio component, and the parsing may occur based on data associated with the segment. In exemplary embodiments, the parsing may occur using one or both of transcript and/or video data associated with the segment, so as to identify a speaker (such as a particular speaker or a particular kind or type of speaker). In exemplary embodiments, the identification of the speaker using such associated data may be performed according to a classification model.

In exemplary embodiments, the text identified by OCR may include a name or phone number appearing on the screen of a teleconference. Upon identifying such text through OCR, it may be used as an indication of the speaker, or cross-referenced against other sources, such as a name or phone number database or a customer relationship management (CRM) system, to provide a further indication of the speaker, which may further include related information such as a title. In embodiments, still or photographic components may be extracted from or derived based on the video component(s). The still or photographic components or the video components may be provided as an input into a neural network trained with tagged characters and/or words, to provide by the neural network, as an output, text. The neural network may be further trained to distinguish between names and other text, (such as standard non-name wording) so as to avoid false-positive identifications of names. Upon identification of the text, and its placement on the screen in connection with a particular display 201, 202, a determination may be made that at least at and around the time of the video used to capture the text, the associated display or view or feed is associated with the same speaker as is associated with the text. Where special text has been placed on the screen, for example manually, to indicate who is talking, such text may be recognized by a neural network specifically trained on such specific text to recognize such specific text.

Lip movement or speech coming from lips may also be identified, in exemplary embodiments, for example by providing video segments as inputs to a neural network, which neural network may be trained with a training set based on videos of faces of individuals who are speaking and of individuals who are not speaking, tagged as such, and providing as an output an indication of who is speaking. Alternately or in addition to video segments from the video component, in embodiments, a plurality of photos, for example two still images, which may be, for example, several frames or 100 milliseconds apart, may be analyzed, for example by providing the plurality of photos to a neural network trained to identify differences in lip position between such sets of still images. Other visual indicators, such as colored rectangles or circles or other shapes provided by teleconferencing software around video feeds of participants when they are speaking or manually inserted visual indicators intended to indicate who is speaking, may also be identified using a neural network trained using training data tagged to differentiate between uses and non-uses of such visual indicators. In exemplary embodiments, where lips are detected as moving and simultaneously sound is detected as audible, labeling may occur, indicating that the respective participant was speaking at the time of the analyzed audio and video segments. In embodiments, to make this determination, an audio segment associated in time with the video segment or series of still frames under analysis, may be provided to a neural network or heuristic or other algorithm to confirm that speech, or speech matching the identified lip movement, is in fact present, and that a label may appropriate be applied.

In exemplary embodiments, lip-movement detection may be used on its own or may be one of several approaches employed in identifying speakers. In exemplary embodiments, for example, a video-based lip-movement classifier may be employed alone. In exemplary embodiments, such classifier may be used to determine a confidence score (for example that lips are moving in a manner associated with speech). In exemplary embodiments, this confidence score may be obtained for one, multiple, or all segments. In exemplary embodiments, for example in parallel with such a classifier approach, other visual or non-visual data, for example transcript data, may be used to determine inferences as to the speaker. In exemplary embodiments, such inferences may be associated with corresponding scores for each of multiple speakers. In exemplary embodiments, different scores or inferences may be combined, for example according to a statistical approach, such as score-averaging. In exemplary embodiments, several of visual and non-visual data (e.g., transcript data, CRM data, to name a few) may be used to train a model or machine learning algorithm or neural network, and/or as inputs provided to such model or machine algorithm or neural network to identify speakers. In exemplary embodiments, such approach may be performed without post-processing of previous or single data-type based models.

In exemplary embodiments, the video components may be analyzed by one or more neural networks or other machine learning algorithms to make determinations related to the visual information or aspects. In embodiments, where a plurality of determinations are made, they may be reviewed together to determine whether labeling of a respective participant as speaking should occur. For example, a segment from a video component, for example a small segment such as one of a few seconds or a portion of a second, may be provided to a first neural network specifically intended and trained to identify lips, and a second neural network specifically intended and trained to identify movement of lip-like shapes. If both neural networks output a positive result, then the label may be applied. Conversely, if either neural network outputs a negative result, then it may be assumed that the other neural network created a false positive with respect to the lip movement, and no label may be applied. In other exemplary embodiments, such neural network operations may be employed sequentially, for example by first employing a neural network trained to determine the location of lips, and then a second neural network being provided a portion of the video segment (or, alternately or in addition, of a set of photos) at that determined location, which second neural network is trained to detect movement at that location. In embodiments, one or more or all of the neural networks employed for these purposes may be a convolutional neural network or series of convolutional neural networks. In embodiments, one or more or all of the neural networks may further use pre- or post-processing with an algorithm or heuristic, or may be replaced by such an algorithm or heuristic.

Visual determinations may also be used to recognize faces, which recognitions may be used for labeling. Computer vision filters may be used for such purpose, for example separately recognizing and analyzing various landmarks associated with facial features such as nose, eyes, and the like to develop a profile that may be uniquely associated with an individual. One advantage provided by this approach is that such an identification may be accurate even when a user is logged into an incorrect account, for example.

The visual appearance of lip movement may be used, for example in conjunction with audio, to confirm that the audio specifically corresponds to the visual appearance of the lip movement. In embodiments, neural network-based phoneme determination (or determination of other visual lip-based indicators of what sound is being produced by the mouth) may be used to confirm that the audio corresponds to the lip movement. This in turn may improve labeling. Moreover, such a determination of phonemes (or of other lip-indicated sounds) may be used to improve the quality of transcription data as to the spoken words in the audio, for example by checking for and correcting possible transcription errors or failures to differentiate between words occurring when transcribing only an audio component.

In exemplary embodiments, additional approaches may be employed with respect to visual and-or audio-visual determination of sounds a speaker or potential speaker who is moving his or her lips is creating. For example, Automated Lip Reading (ALR), audio visual speech recognition (AVSR), audio visual-automated speech recognition (AV-ASR), articulatory speech recognition, deep learning based ALR systems, and/or any of the foregoing further employing word, sentence, phrase and topic recognition and/or final classification employing a LSTM layer or other deep learning based sequence classification architecture.

In exemplary embodiments, the visual aspects discussed herein, such as lip movement, OCR text, and/or other visual indictors may function to tag respective speech segments as being associated with a particular source feed, and/or to function to diarize the teleconference. The analysis of such visual indications may, in exemplary embodiments, function in place of, or to generate, conference metadata.

In exemplary embodiments, further methods for identifying speakers in a teleconference, such as an online teleconference (e.g. a Zoom teleconference) are provided, for example in situations where metadata (e.g. when metadata in the form of a "timeline.json" file is not provided or is otherwise not available).

According to one such methodology, a Current-Speaker video view associated with such an online teleconference may be consulted. In such a view, a single window may be displayed, (or a window is selectively displayed at a particular position and/or size) which is intended by the teleconferencing software to reflect the video portion of the stream obtained from the current speaker as identified by the teleconferencing software. A name associated with the reflected the speaker may be displayed in connection with such view. For example, the name may be selectively displayed at a lower left corner of such screen or screen portion when a video of the speaker is being obtained by the teleconferencing software from the reflected speaker (for example, when the speaker's camera is enabled), and selectively displayed in a middle or center of such screen or screen portion when there is no such video of the speaker is available (for example, when the speaker's camera is not present or is disabled by the speaker).

In exemplary embodiments of these methods, the sole or emphasized screen associated with the Current-Speaker view may be cropped so as to capture the portions of such screens that may be associated with the name. For example, in the case of Zoom, the crop may obtain the lower left and middle of the screen, for example with only one of these two crops containing text. Samples of these cropped portions may be taken at intervals according to the desired degree of accuracy of the speaker identification. In exemplary embodiments, every video frame may be captured, or a relatively smaller proportion of frames may be captured, for example three frames every second (e.g. at regular intervals). In exemplary embodiments, a determination may be made as to the similarity of cropped portions of successive obtained frames, and, where successive frames are determined to be similar, further analysis may be performed on only one of two or more similar frames, advantageously reducing usage of computational resources.

According to exemplary embodiments, OCR (for example, according to the various methodologies discussed herein) may be run on the cropped portions of the frames, so as to identify the name (or, in some cases, phone number if such information is presented in lieu of a name) of the current speaker. In order to increase accuracy, in exemplary embodiments, fuzzy matching, with respect to possible participant names (e.g. as may be obtained from a CRM system or calendar invite) may be performed in order to locate a match of the name and/or phone number. For example, according to exemplary embodiments, such fuzzy matching may be based on a smallest distance (such as a Levenshtein distance) between the OCR'd name or phone number and that of the various possible participants. Such match may be expressed absolutely, or in probabilistic terms. In exemplary embodiments, smoothing algorithms (e.g. Viterbi, CRF, and MEMM), which may take into account the sequential nature of the frames may be applied to such probabilities, for example, in situations where similar frames have not been excised from the analysis. Such smoothing algorithms may advantageously reduce the chance of false identification(s).

For example, in the event of a slight OCR error with respect to a single character of a first and last name (e.g. an initial misrecognition of the name Daffi Doogan instead as Daffl Dooyan, in exemplary embodiments, the calculation may result in the following data and prediction:

TABLE 1

|     | Daffi Doogan | Andi Daomah | Zed Karp |
| --- | --- | --- | --- |
| MID | 0.8 | −0.5 | −0.7 |
| BL | −1 | −1 | −1 |
| MAX | 0.8 | 0.5 | 0.7 |

TABLE 2

| Daffi Doogan | Andi Daomah | Zed Karp | PREDICTION |
| --- | --- | --- | --- |
| 0.8 | −0.5 | −0.7 | Daffi Doogan |

The video being analyzed, for example by teleconferencing software such as Zoom, may contain all or multiple of the participants' screens and/or video outputs in the video under analysis, and/or not provide a special location or size for an indicated speaker.

In exemplary embodiments, in such situations, preliminary processing steps may be taken. For example, in exemplary embodiments, an identification may be performed as to the various mini-screens of each of the participants, or each of the participants shown in the video under analysis at a particular time. In exemplary embodiments, based on the identification of the screens, each may be analyzed for the presence of lip movement, or based on the presence of another visual indication (for example, a colored box or rectangle) indicating an active speaker according to the various methodologies discussed herein. Then, the OCR methodologies as discussed herein, for example those involving the performance of OCR and fuzzy or other matching of the results, may be performed on such screen identified as containing an active speaker. Advantageously, according to exemplary embodiments, a mapping of particular screens to particular speaker names may be set up, so that the OCR process need only be run once per screen, and thereafter such mapping may be consulted. In other embodiments, no such mapping may be employed or the mapping may cease to be consulted, for example upon a situation where it is determined that the number of speakers exceeds a threshold amount that the teleconferencing software displays at once and therefore there is not a permanent association between a particular screen or screen position and a speaker. In exemplary embodiments, the mapping may be consulted until a user enters or leaves the teleconference, at which time the mapping may be reconstructed through the herein described OCR processes.

Figure 8:
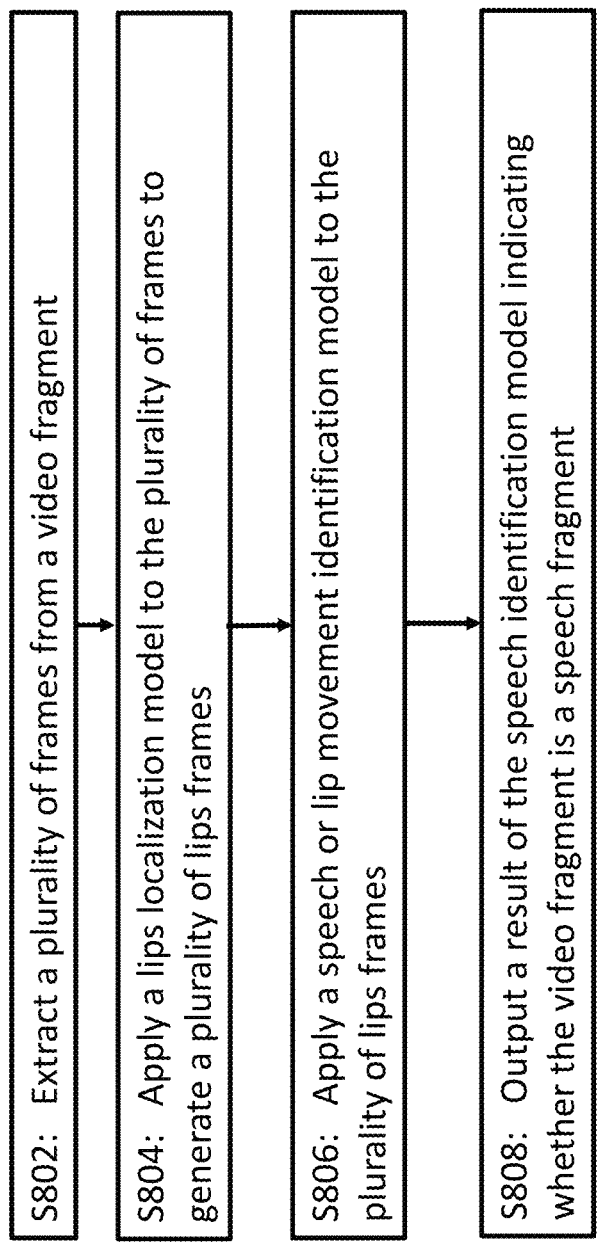
FIG. 8 is a flow chart that schematically illustrates a process for visual identification, based on lip movement, of whether a video fragment or segment contains speech.

FIG. 8 is a flow chart that schematically illustrates, according to an exemplary embodiment, a process for visual identification, based on lip movement, of whether a video fragment or segment contains speech, that is, is a speech fragment. In exemplary embodiments, at step S802, a plurality of frames may be extracted from a video fragment. In exemplary embodiments, this may be a video fragment corresponding to a segment, such as a segment identified by particular metadata as pertaining to a particular (for example, yet unidentified) speaker. The plurality of frames may be all of the frames of the video segment, or a portion of the frames (for example, frames corresponding to a subsegment of a defined length or every other frame or other fractional portion of the frames of the video segment).

At step S804, according to exemplary embodiments, a lips localization model may be applied to the plurality of frames to generate or extract a plurality of lips frames. For example, a visual filter may be employed, as discussed herein, to isolate a portion of the fragment frames associated with lips. The lips frames may have portions of the fragment frames not pertaining to lips removed, or the lips frames may contain such portions but be associated with an indication of where in the fragment frames the portions pertaining to lips are located.

At step S806, according to exemplary embodiments, a speech or lip movement identification model may be applied to the plurality of lips frames. For example, as discussed herein, a neural network trained to recognize lip movement based on a training set comprised of video segments or frame sets tagged with whether or not lips are moving may be used, with the lips frames as an input, according to such lip movement identification model. A result may be generated based on such model indicating whether the video fragment is a speech fragment. The result may be in the form of a Boolean or true/false indication of whether the video fragment is a speech fragment, or may be a score or confidence indicator or probability as to whether the video fragment is a speech fragment.

In embodiments, the models of step S804 and S806 may be combined into a single lips localization and lips or speech identification model, identifying both the location of lips and whether the lips are moving or speaking.

At step S808, accordingly to exemplary embodiments, a result of the speech identification model indicating whether the video fragment is a speech fragment may be output, for example in the forms as discussed above in connection with step S806. According to exemplary embodiments, as discussed herein, such output may be used in a determination of whether a portion of the transcript pertaining to the segment associated with the video fragment is associated with a particular speaker, or in the identification of a particular speaker.

Pseudocode for the process illustrated by FIG. 8, in exemplary embodiments, may be as follows:

speech_fragments=[ ]
for fragment in video:
　frames=get_frames(fragment)
　lips_crops=[ ]
　for frame in frames:
　lips_crops.append(crop_lips(frame))
　lips_tensor=concatenate(lips_crops)
　speech_probability=model(lips_tensor)
　speech_fragments.append(speech_probability)

In exemplary embodiments, models employed in connection with the process shown in FIG. 8 and in connection with the above pseudocode may include, for example, 3D convolutional networks, or a combination of convolutional layers and one or more recurrent neural networks (for example, long short-term memory (LSTM) networks).

In exemplary embodiments, for example according to the above pseudo-code, the distribution obtained in speech_fragments may be smoothed. This may, in exemplary embodiments, be performed using a sequential nature of the video fragments. An algorithm or model for the smoothing may, in exemplary embodiments, be applied. For example, Viterbi, MEMM or CRF algorithms or models may be employed.

In exemplary embodiments, the neural network or networks employed may be, or comprise one or more of, a neural network or employing machine learning, an artificial neural network, a deep neural network, a convolutional neural network, a 3d convolutional neural network, a neural network or deep neural network with a convolutional neural network layer, a recurrent neural network, a feedforward neural network, an autoencoder or Diabolo network, a probabilistic neural network, a time delay neural network, a deep stacking network, a tensor deep stacking network, a regulatory feedback network, a radial basis function network, a general regression neural network, a deep belief network, a recurrent neural network, a fully recurrent neural network, a Boltzmann machine, a self-organizing map, a learning vector quantization, a simple recurrent network, reservoir computing, an echo state network, a bi-directional recurrent neural network, a hierarchical recurrent neural network, a stochastic neural network, a modular neural network, a committee of machines, an associative neural network, a physical neural network, an instantaneously trained neural network, a spiking neural network, a neocognitron, a compound hierarchical-deep model-composed deep network, a deep predictive coding network, a multi-layer kernel machine, a dynamic neural network, a cascade correlation-based network, a neuro-fuzzy network, a compositional pattern-producing network, a one-shot associative memory network, a neural Turing machine, a pointer network, and/or an encoder-decoder network. The neural network may have a transformer architecture, and may include an attention mechanism.

In exemplary embodiments, the various rules or heuristics discussed herein may be explicitly suggested to a neural network via manually created training set data classifying based on certain behavior or visual indicators, or the neural network may simply be trained, for example using a machine learning algorithm, based on visual indicia of individuals with known classifications, advantageously avoiding such a relatively manual and potentially biased training process.

In exemplary embodiments, the various rules or heuristics discussed herein may be used for identification of particular individuals. For example, a neural network may be trained on training set data tagged with whether or not a speaker is a particular individual, and may thereby be used to determine whether future visual or text and speech and cadence patterns can be labeled with that person.

According to exemplary embodiments, at substep S608C, which may occur after substep S608B, refining or labeling of the respective components occurs, for example, based on the identification. In exemplary embodiments, each respective segment from the same source feed may be labeled. This labeling may be based on one or both of the teleconference metadata and identified respective speaker information, such as may be associated with the respective source feed and/or speech segment.

Use of Diarization Results in Coaching Salespeople

In some embodiments of the present invention, server 101 diarizes a large body of calls made by salespeople in a given organization, and outputs the results to a sales manager and/or to the salespeople themselves as an aid in improving their conference behavior. For example, server 101 may measure and output the following parameters, which measure relative durations and timing of speech by the participants (in this case, the salesperson and/or the customer) in each call:

Talk time: What percentage of the conversation is taken up by speech of each participant, or by no one speaking. Such parameter may be selectively measured and/or outputted only for salespeople.

Longest monologue: How long does the participant, speak without pausing, for example for more than a predetermined interval of time, or for example until another speaker replaces the participant in the conversation and/or provides interjections determined to be adequately substantive, for example to provide feedback the participant. For example, the processor(s) of server 101 may measure the longest segment of continuous speech, allowing for only non-informative interruptions by the customer (such as "a-ha") to avoid a determination that the monologue has ended, and/or allowing for only longer phrases, such as longer phrases having other than standard utterances (e.g. a longer phrase with substantive content like "That is interesting, but I want to know more about pricing"), to end the monologue. Such parameter may be selectively measured and/or outputted only for salespeople.

Longest customer story: A good salespeople is expected to be able to ask customers open-ended questions. Therefore, the processor(s) of server 101 may measure the longest "story" by a participant, i.e., the longest continuous speech by the participant, allowing for only short interruptions by the salesperson (typically up to 5 sec). Such parameter may be selectively measured and/or outputted only for the customer, which may for example be assumed to be all participants other than those determined to be salespeople.

Interactivity: When selling a product of a particular complexity, there may be advantages to employing certain rates as to how often the call goes back and forth between the parties. This parameter can be assigned a score, for example on a scale of 0 to 10. The score might represent how closely this parameter matches a preferred rate, or simply provide a qualitative indication of how often the change in speakers before. This parameter can be assigned other measures, such as changes in speaker per minute, which might for example range between 0 and 30 speaker changes per minute.

Patience: How long does the salesperson wait before regaining the conversation after the customer speaks. In other words, does the salesperson wait to ensure that the customer has completed a question or statement, or does the salesperson respond quickly to what might be an incomplete statement? This might be measured for example in terms of the average amount of silence between intervals in which customers are speaking and intervals in which salespeople are speaking. In order to determine this parameter, the system may keep track of which participants are salespeople, and which participants are customers.

Figure 7A:
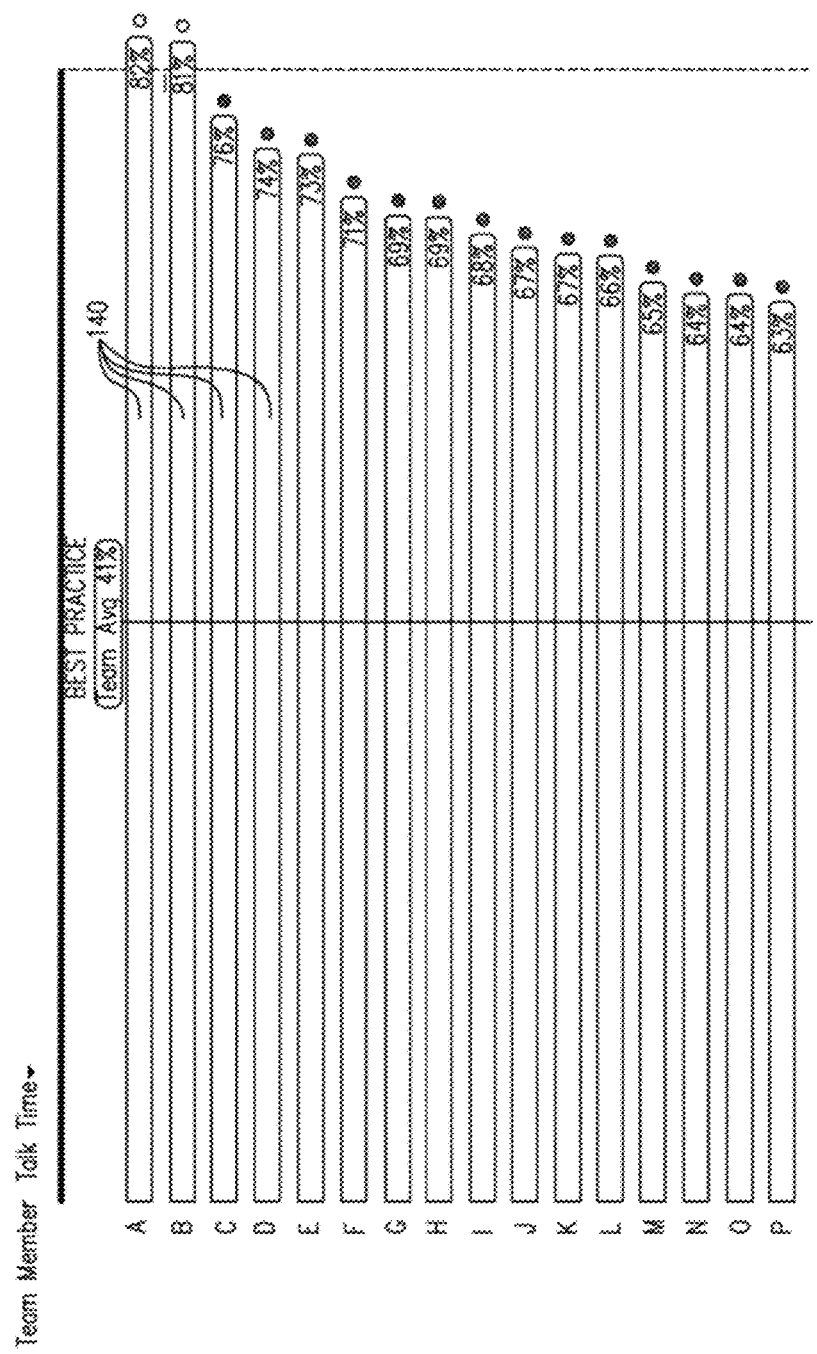
FIG. 7A is a bar chart that schematically shows results of diarization of multiple conversations involving a group of different speakers, in accordance with embodiments of the present invention.

FIG. 7A is a bar chart that schematically shows results of diarization of multiple conversations involving a group of different speakers, for example salespeople in an organization, in accordance with an exemplary embodiment of the invention. Each bar 140 shows the relative "talk time" of a respective salesperson, labeled "A" through "P" at the left side of the chart. Such a bar chart may be generated and displayed as a call to action according to exemplary embodiments of the invention. Due to the increased accuracy of the diarization as a result of the improved diarization systems and methodologies herein, the talk time, for example, a portion of the overall call spent talking between a particular seller A-P, may advantageously be computed with a high level of accuracy, such as sufficient to draw fine distinctions between good sales practices by such sellers and poor sales practices that are not in line with best practices. In embodiments, a best practice with which the accurate results may moreover be indicated, for example, with a dotted line as shown in FIG. 7A.

FIGS. 7B-7I are user interfaces containing bar charts that schematically show additional results of diarization of multiple conversations involving a group of different speakers, (labeled "A" through "J" or, in the case of FIG. 7H "A" through "L" and in the case of FIG. 7I, "A" through "N") in accordance with embodiments of the present invention. Such interfaces and/or bar charts may be generated and displayed as calls to action according to exemplary embodiments of the invention, and may be indexed by appropriate tabs.

Figure 7B:
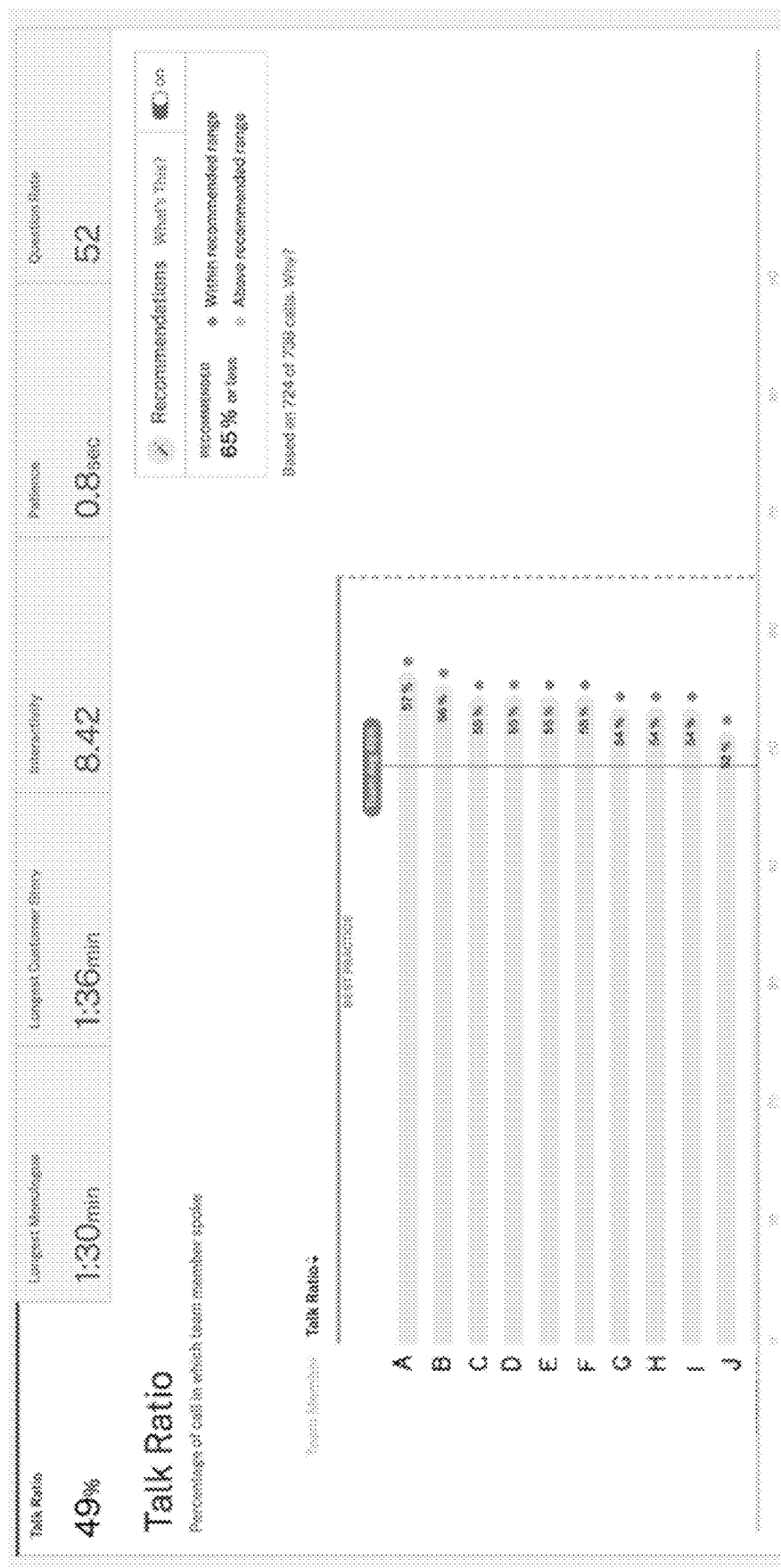

In FIG. 7B, a talk ratio is shown for various participants or members of a sales or other team, which may include a calculated average for the participants, group or team, as well as an indication of a best practice figure, and tooltips with recommendations. Information of particular value, such as the team average, may be prominently displayed at the tab itself. Due to the increased accuracy of the diarization as a result of the improved diarization systems and methodologies herein, the talk ratio, for example, a ratio of time spent talking between a particular seller A-J and a buyer on the call, may advantageously be computed with a high level of accuracy, such as sufficient to draw fine distinctions between good sales practices by such sellers and poor sales practices that are not in line with best practices. Given that such distinctions may be important to retention, promotion, and coaching decisions, such accuracy in the ultimate determination and the diarization data upon which it is based may be of great importance.

Figure 7C:
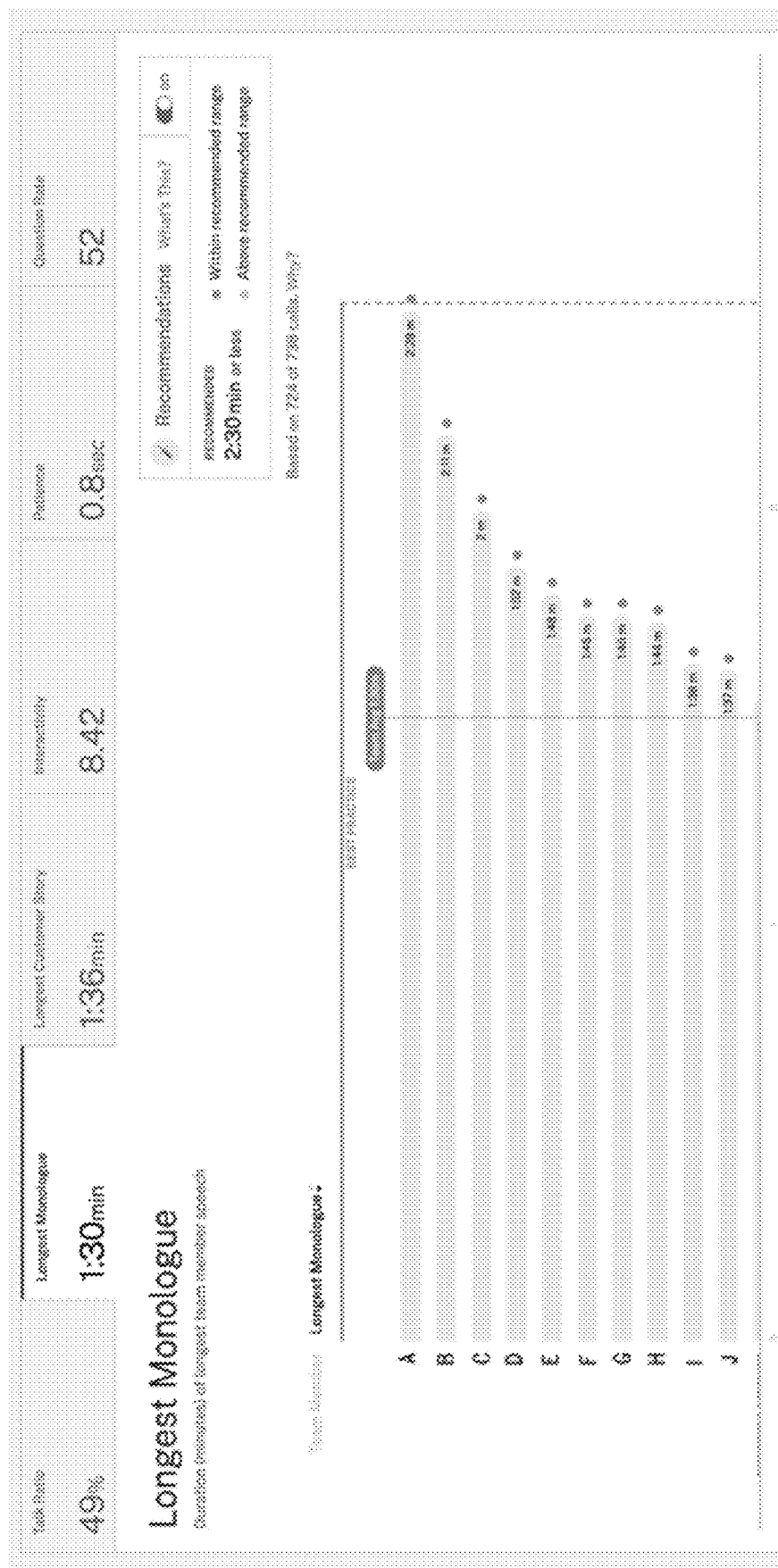

In FIG. 7C, a longest monologue is shown, indicating for example a longest uninterrupted speech segment belonging to each individual. Due to the increased accuracy of the diarization as a result of the improved diarization systems and methodologies herein, the longest monologue, for example, a longest amount of time spent talking without interruption by a particular seller A-J on the call, may advantageously be computed with a high level of accuracy, and with a high degree of confidence that the longest monologue was not in fact by another speaker on the call, which fact would completely undermine the determination of the longest monologue. Such accurate longest monologue time is sufficient to draw fine distinctions between good sales practices by such sellers and poor sales practices that are not in line with best practices, for example with a best practice being indicated with a dotted line as shown towards the right of FIG. 7C. Given that such distinctions may be important to retention, promotion, and coaching decisions, such accuracy in the ultimate determination and the diarization data upon which it is based may be of great importance.

Figure 7D:

In FIG. 7D, an indication of interactivity is provided for each individual, for example being a measure (e.g. on a 0-10 scale) of how quickly or often that individuals' corresponding speech segments changed over to speech segments of other individuals on the call. Due to the increased accuracy of the diarization as a result of the improved diarization systems and methodologies herein, the interactivity by a particular seller A-J on the call, may advantageously be computed with a high level of accuracy, and with a high degree of confidence that determined changes in speakers (for example, from the particular seller A-J and a customer) are accurately determined. Such interactivity measure is sufficient to draw fine distinctions between good sales practices by such sellers and poor sales practices that are not in line with best practices, for example with a best practice being indicated with a dotted line as shown towards the center of FIG. 7D. Given that such distinctions may be important to retention, promotion, and coaching decisions, such accuracy in the ultimate determination and the diarization data upon which it is based may be of great importance.

Figure 7E:
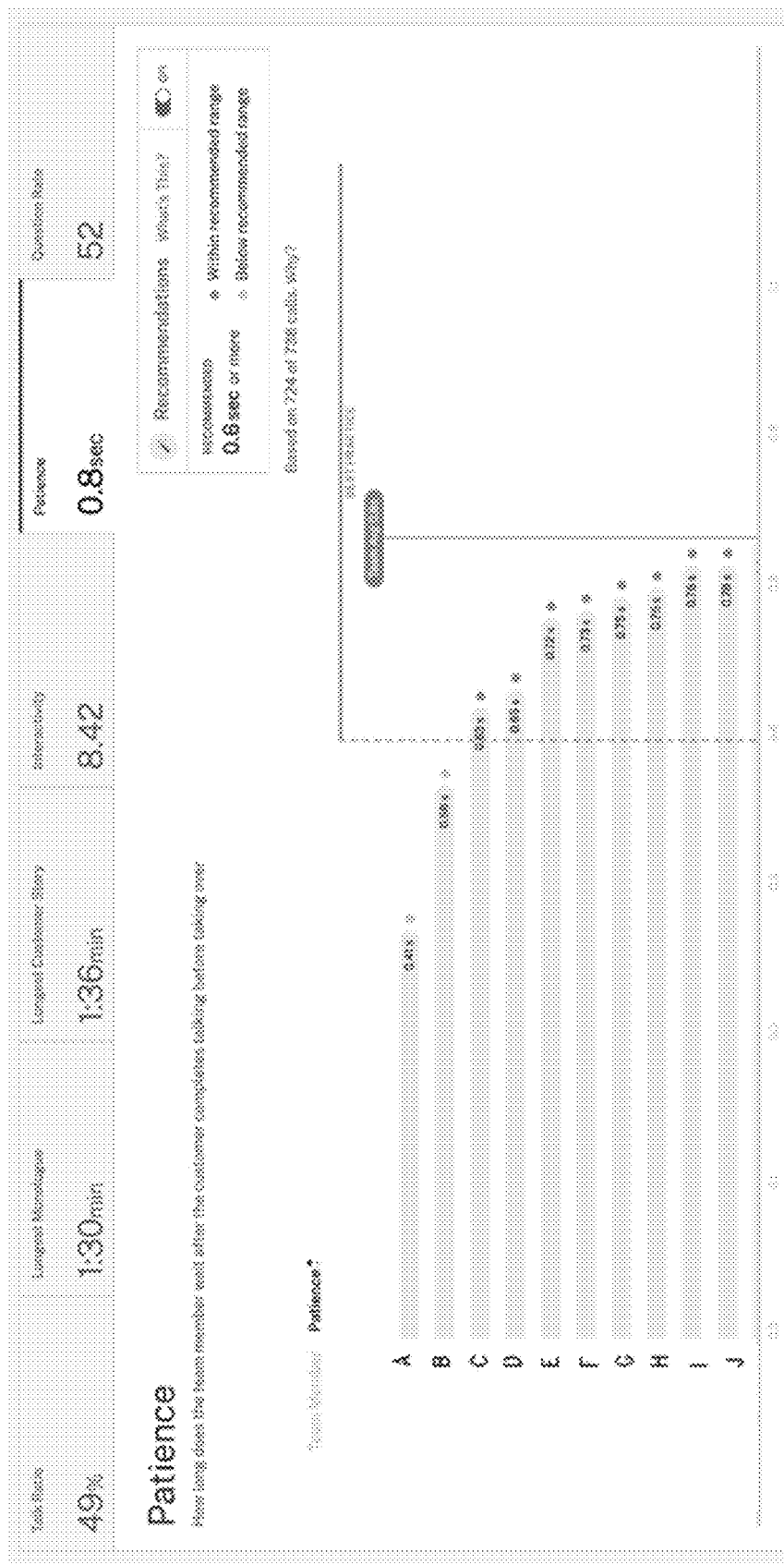

In FIG. 7E, a patience indicator is provided, indicating how long the individual pauses during a speech to allow others to respond, before resuming active speech. Due to the increased accuracy of the diarization as a result of the improved diarization systems and methodologies herein, such measure of patience, for example by a particular seller A-J on the call, may advantageously be computed with a high level of accuracy, and with a high degree of confidence that determined changes in speakers (for example, from a customer, to a period of silence of a known or determinable or measurable length (for example based on associated timestamps), to the particular seller A-J) are accurately determined. Such accurate patience measure is sufficient to draw fine distinctions between good sales practices by such sellers and poor sales practices that are not in line with best practices, for example with a best practice being indicated with a dotted line as shown towards the center of FIG. 7E.

Given that such distinctions may be important to retention, promotion, and coaching decisions, such accuracy in the ultimate determination and the diarization data upon which it is based may be of great importance.

Figure 7F:
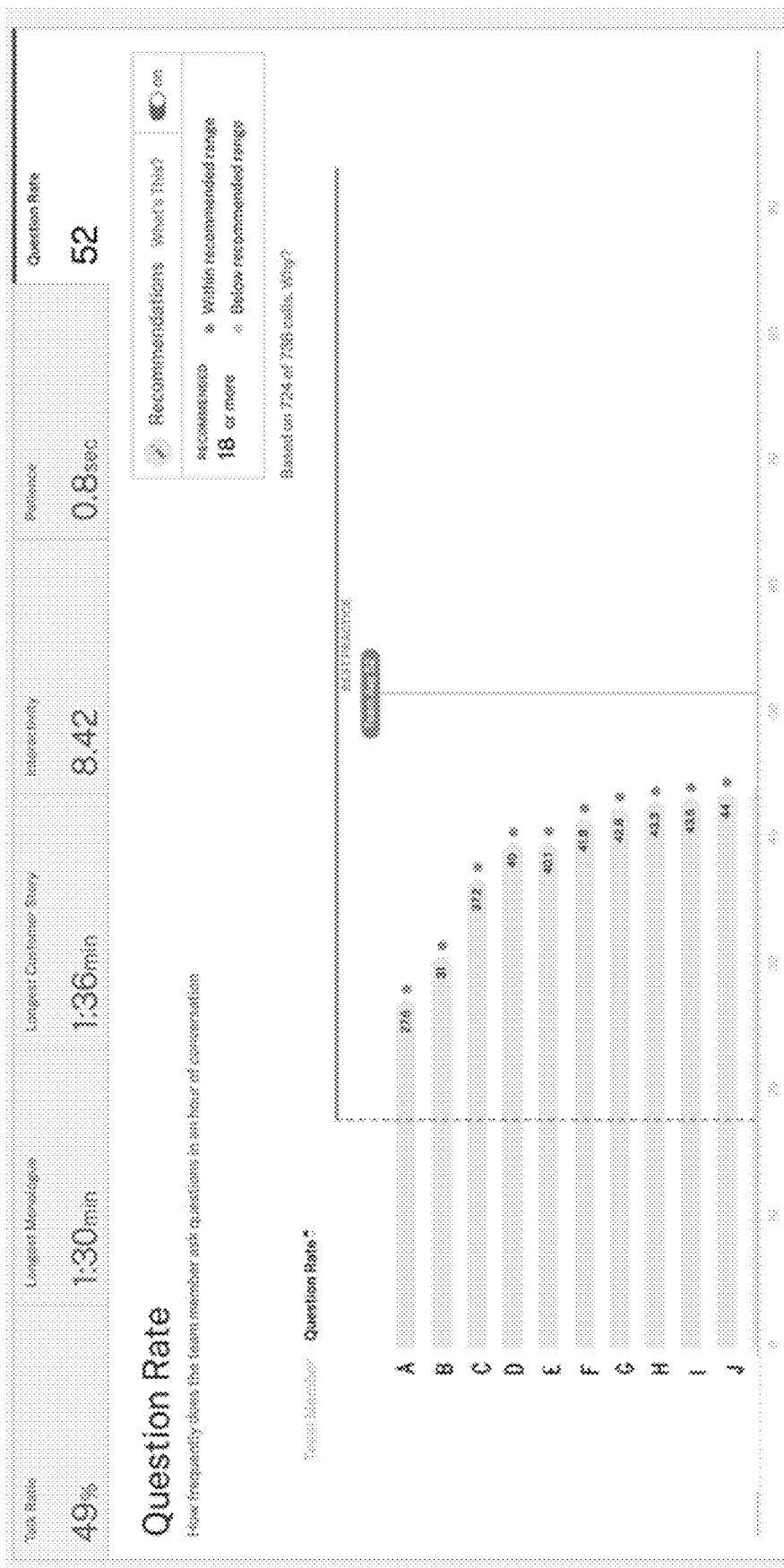

In FIG. 7F, a question rate is provided, indicating how often (for example, how many times per hour) each individual poses questions (the existence of which may be determined for example according to an NLP model, carried out for example by a machine learning algorithm trained on a training set of statements tagged with whether or not they are questions). Due to the increased accuracy of the diarization as a result of the improved diarization systems and methodologies herein, for example both with respect to who is making a statement and with respect to the content of such statement, a question rate, for example, an indication of questions per unit time uttered by a particular seller A-J on the call, may advantageously be computed with a high level of accuracy, and with a high degree of confidence that the question was not in fact by another speaker on the call. Such accurate question rate measure is sufficient to draw fine distinctions between good sales practices by such sellers and poor sales practices that are not in line with best practices, for example with a best practice being indicated with a dotted line as shown towards the left of FIG. 7F. Given that such distinctions may be important to retention, promotion, and coaching decisions, such accuracy in the ultimate determination and the diarization data upon which it is based may be of great importance.

Figure 7G:

In FIG. 7G, a topics duration and specific information for an individual topic or topics is provided, indicating, for example for a team and for individuals respectively, how long they spoke about particular topics (which again may be identified based on, for example, an NLP model). A variety of terminology accordingly may be determined to be associated with, and to result in an identification of, a particular topic. Due to the increased accuracy of the diarization as a result of the improved diarization systems and methodologies herein, for example both with respect to who is making a statement and with respect to the content of such statement, such information, for example, an indication of how long various topics are discussed by a class of individuals (e.g. sellers) or particular individuals (e.g. specific sellers A-J) on the call, may advantageously be computed with a high level of accuracy, and with a high degree of confidence that the topic was not in fact by another speaker or type of user (e.g. a buyer) on the call. Such accurate topics duration measures is sufficient to obtain an accurate assessment of whether each individual is adequately addressing particular topics of importance (and avoiding topics of lesser importance), and determining whether individuals may be conforming to or diverging from averages across a seller team (indicated with a dotted line towards the right of FIG. 7G). Given that such distinctions may be important to retention, promotion, and coaching decisions, such accuracy in the ultimate determination and the diarization data upon which it is based may be of great importance.

Figure 7H:
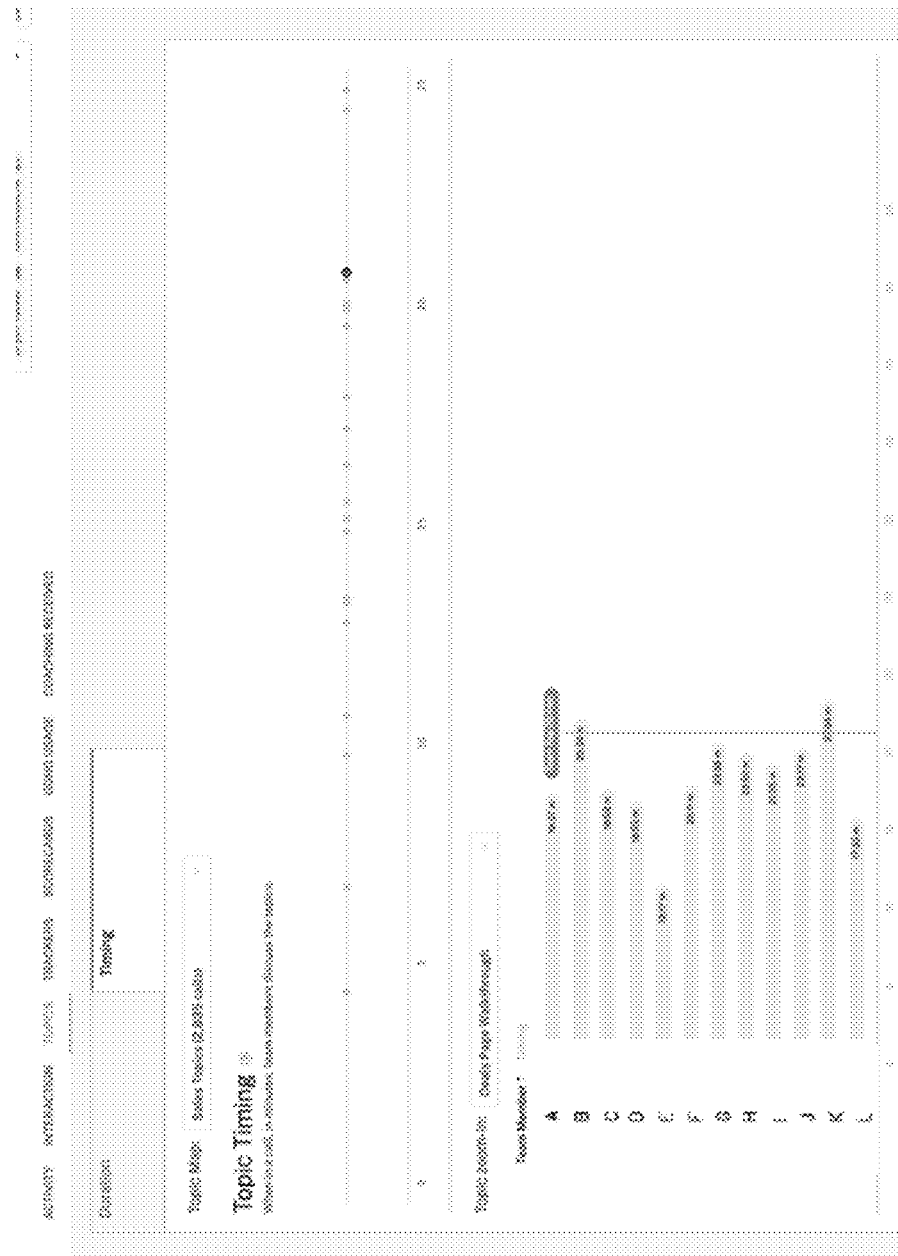
Figure 71:
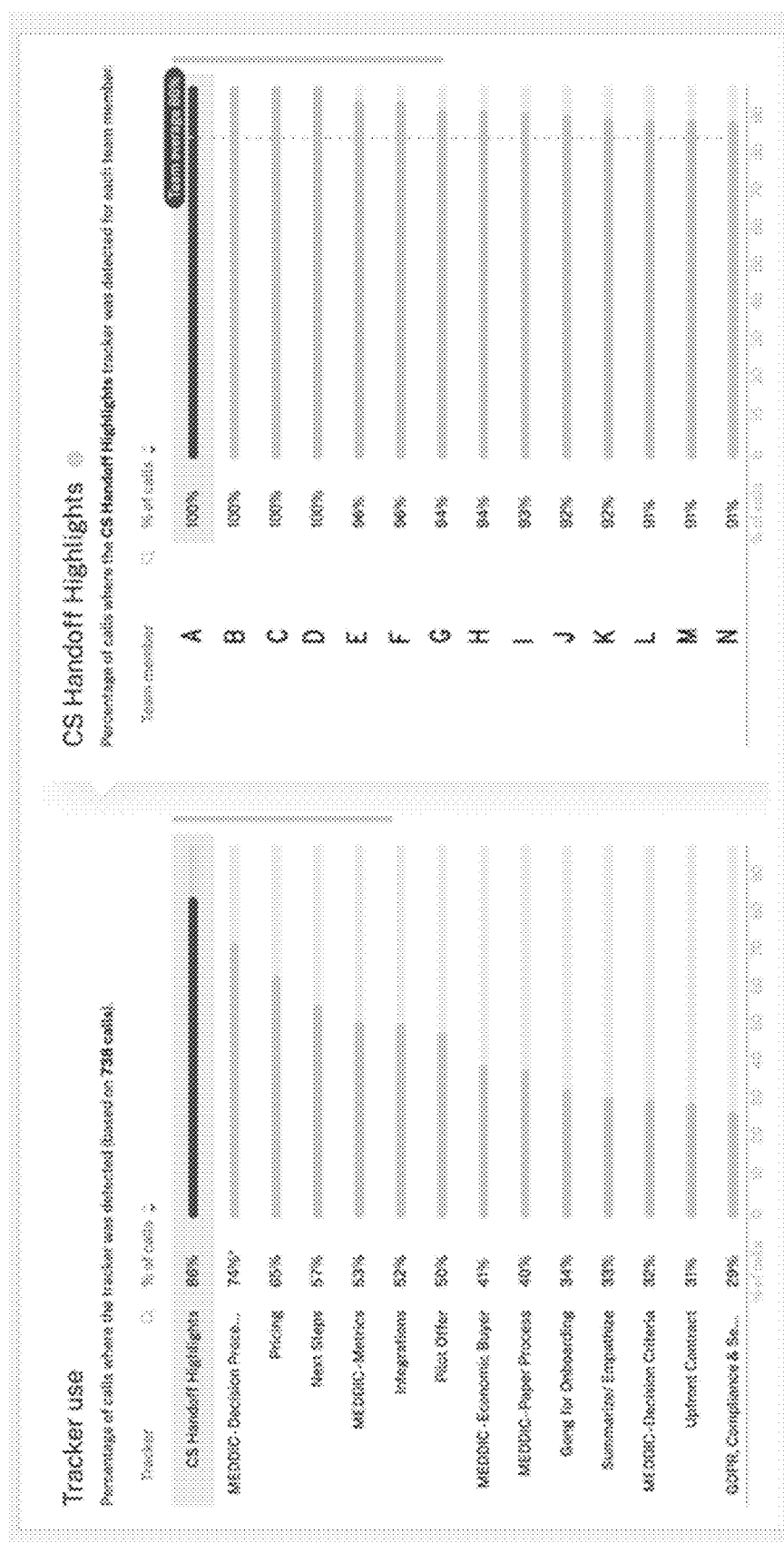

In FIG. 7H, topic timing is illustrated, for example for a particular selected topic (e.g., a deals page walkthrough). The topic of interest may be selected by a user, for example using one or more dropdown menus. The display may show, visually for example according to a timeline, where particular topics tend to be brought up in calls, for example, on average across many calls and across many users. This timeline may also be used for selection of other topics, for example by clicking on various identified points in the timeline, A bar chart may be provided showing where topics tend to be brought up by various users, for example along with a team average. Due to the increased accuracy of the diarization as a result of the improved diarization systems and methodologies herein, for example both with respect to who is making a statement and with respect to the content of such statement, such information, for example, an indication of how long various topics are discussed by particular individuals (e.g. specific sellers A-J) on the call, as well as visual demonstrations of where on the call various topics may be discussed, may advantageously be computed with a high level of accuracy. Such accurate topics duration measures is sufficient to obtain an accurate assessment of whether each individual is adequately addressing particular topics of importance (and avoiding topics of lesser importance), and determining whether individuals may be conforming to or diverging from averages across a seller team (indicated with a "Team Avg" line towards the center of FIG. 7H), as well as obtaining a quick and accurate visual overview of the overall topic flow of a call or average across a number of calls.

In FIG. 7I, tracker use and specific information for an individual tracker or trackers is illustrated, indicating, for example for a team and for individuals respectively, reflecting how often a particular topic was determined by a tracker to be mentioned across a plurality of calls. Such trackers may be identified according to the mention of a particular key word or key words by the individual or team during the call. Key words may be set, for example, by an individual or organizational user. Topic discussion and use of particular trackers may be evaluated for correspondence with a measure of success (e.g. a closed sale), and recommendations may be provided (for example on the interface) as to suggested topics and trackers to use during calls or teleconferences. The call participants shown in such interfaces may be all individuals tracked by the system, individuals on particular calls, or a limited subset of all individuals tracked by the system, for example, members of a sales team. Due to the increased accuracy of the diarization as a result of the improved diarization systems and methodologies herein, such information, for example, which of several sellers A-N may be uttering a particular tracked expression (as opposed to some other speaker, such as a customer, for example) may advantageously be determined with a high level of accuracy. Such accurate topics duration measures is sufficient to obtain an accurate assessment of whether each individual is adequately mentioning particular keywords of importance (and avoiding keywords of lesser importance), and determining whether individuals may be conforming to or diverging from averages across a seller team (indicated with a dotted line towards the right of FIG. 7I). Given that such distinctions may be important to retention, promotion, and coaching decisions, such accuracy in the ultimate determination and the diarization data upon which it is based may be of great importance.

The processor(s) of the server 101, for example, may correlate the talk times with sales statistics for each of the salespeople, taken from a customer relations management (CRM) database of an organization, for example. On this basis, the processor(s) may identify optimal or beneficial speech patterns, such as optimal or suggested or best practice talk time, team average talk time, and other parameters, for increasing or maximizing the productivity of sales calls. The salespeople may then receive feedback and coaching on their conversational habits that will enable them to increase their sales productivity.

According to exemplary embodiments, and with reference again to FIG. 6, at step S610 a call to action may be generated, for example by the processor(s) of the server 101.

This call to action may be based on the labeling, for example performed at substep S608C, which labeling may provide an improved understanding of which speakers are associated with which portions of the conference.

According to exemplary embodiments, one or more of various calls to action may be employed, for example those discussed above in connection with FIG. 7A-H and those discussed below:

Statistics and Coaching

In exemplary embodiments, users may, for example from the processor(s) of the server 101 communicating over the network 102, receive user recommendations about how to improve their conversations, with such recommendations being a form of call to action. For example a user such as a salesperson may be instructed to "talk less" or "have more patience before replying", e.g. based on analyses as discussed above in connection with the various parameters. Determinations may be made as to what aspects of or statements on teleconferences tend to be associated with top-performing salespeople or with closed deals. Analyses may be provided, for example, with respect to duration (e.g. average duration) of various topics, a ratio of talking between various participants, and a rate of questions being asked (for example, by salespeople or by customers). Information regarding particular salespeople or customers of note, for example, the fact that an individual salesperson talks significantly more than the average salesperson about a particular topic, may also be presented, potentially along with an indication that such salesperson is a top performer. Coaching materials may selected and sent to individuals, for example materials directed to subject matter that a salesperson has been identified as having associated performance deficiencies. Analyses may also be presented of how often known competitors are discussed, for example by customers, on teleconferences. Deal size may also be included in these analyses, for example, presenting a chart showing an association between mention of certain topics and average deal size.

Decisionmaker Involvement

In exemplary embodiments, the system may, as a further call to action, highlight the involvement or need to involve decisionmakers, such as those determined to have spending authority, and provide an associated alert that such decisionmaker is either present ("e.g. Janet Foe is a decisionmaker on this teleconference") or not present during a teleconference (e.g. "You're talking to many people, but none of them is a decisionmaker"). Titles of individuals may be obtained for this purpose from sources such as titles extracted from statements on the call, email signatures, electronic calendar invites, or databases which may be created that associate individuals and their titles. Such titles may be used, for example by a neural network trained as to whether persons having various titles are decisionmakers, to identify whether the individuals are decisionmakers. Analyses may be performed and presented, for example for coaching purposes, of the sales effect of having persons who are decisionmakers or who have particular titles, on a teleconference. For example, a particular higher win or sales closure rate with respect to engaging with someone of director-level or above, may be presented.

Identification of Objections and Questions

In exemplary embodiments, the system may, as a further call to action, highlight questions asked or objections raised by a teleconference participant such as a customer, and provide a prompt to a user with respect to such questions and/or objections. Advantageously, providing such information may aid in for example in the creation by salespeople of a deal proposal and in making sure all relevant questions are addressed. Objections may be identified by example by keyword or key phrase (for example, "I'm afraid" or "unfortunately"), for example through a fixed heuristic or algorithmic rule, or through comparison of portions of speech with a neural network trained on a data set of known or suspected objection speech, for example in the form of sentences or approximately sentence-length utterances, that has been tagged as such, in combination with a data set of known or suspected non-objection speech, again tagged as such. Similarly, questions may be identified by a neural network trained on a data set of questions (for example, if provided in audio form, this may allow for detection of voice inflection that is question indicative), or through syntactical analysis of transcripts. Syntactical analysis of transcripts may be accomplished using an NLP-task focused neural network focused on such semantic understanding, for example of sentences, and through obtaining a classifier as to whether it is an objection or a question. A list of objections, for example those occurring during a particular teleconference, may be created, and such list may be used in connection with calls-to-action (e.g. "Jimmy Loe asked 'what is the function of this product?'" or "John Doe objected, 'Can't do it, too pricy'"). Titles may be considered in determining whether an objection should be included in a list, for example, only including objections voiced by decisionmakers or by upper-level management (the classification for which may be determined by neural network trained for such purposes, or from consulting a database such as a CRM maintained with such associations between titles and decisionmaker or upper-level management or other relevant status). Based on the particular objections, helpful sales materials, such as decks or case studies, may be, for example, provided to the salesperson, or provided in a tailored email as discussed below.

Tailored Email Creation

In exemplary embodiments, the system may, as a further call to action, generate a draft or send a tailored email or other form of correspondence such as a voicemail or SMS or letter, to one or more or all meeting attendees at a teleconference, for example, all attendees determined to be customers. For example, contextual information, for example regarding the position of an individual, and questions or objections posed by such individual, may be used in determining the content of such email. For example, if a person on a call is determined to be a lawyer and to have asked a particular question, then a legally-related email may be drafted or sent along the lines of "Hi Marie, In our call today, you asked if we were compliant with the Illinois Act. Accordingly, I am attaching here, for you to review with your client, a copy of this Act and our website pages discussing this Act."

Deal Assessment

In exemplary embodiments, an estimate may be provided as to a probability of closing a deal discussed on a particular call, for example by employing machine learning using a neural network with a training set of other call transcripts tagged with whether or not the associated deal closed in the cases associated with those other calls. For example, an indication may be provided that "Based on our analysis, we believe the chances of this deal closing are 73%, so please schedule a follow-up call soon." In exemplary embodiments, an assessment may be provided as to an extent of contact with a particular person or organization associated with a deal, based for example on determined talk time on a call or a collection of calls. Assessments may be provided as to an expected timing of when a deal may close.

In exemplary embodiments, there is a method for using visual information in a video stream of a first recorded teleconference among a plurality of participants to diarize speech, the method involving: (a) obtaining, by a computer system, components of the first recorded teleconference among the plurality of participants conducted over a network, the respective components including: (1) an audio component including utterances of respective participants that spoke during the first recorded teleconference; (2) a video component including a video feed as to respective participants that spoke during the first recorded teleconference; (3) teleconference metadata associated with the first recorded teleconference and including a first plurality of timestamp information and respective speaker identification information associated with each respective timestamp information; (4) transcription data associated with the first recorded teleconference, the transcription data being indexed by timestamps; (b) parsing, by the computer system, the audio component into a plurality of speech segments in which one or more participants were speaking during the first recorded teleconference, each respective speech segment being associated with a respective time segment including a start timestamp indicating a first time in the first recorded telephone conference when the respective speech segment begins, and a stop timestamp associated with a second time in the first recorded telephone conference when the respective speech segment ends; (c) tagging, by the computer system, each respective speech segment with the respective speaker identification information based on the teleconference metadata associated with the respective time segment; and (d) diarizing the first recorded teleconference, by the computer system, in a process involving: (1) indexing, by the computer system, the transcription data in accordance with respective speech segments and the respective speaker identification information to generate a segmented transcription data set for the first recorded teleconference; (2) identifying, by the computer system, respective speaker information associated with respective speech segments using a neural network with at least a portion of the video feed corresponding in time to at least a portion of the segmented transcription data set determined according to the indexing as an input, and providing source indication information for each respective speech segment as an output and using a training set including visual content tagged with prior source indication information; and (3) labeling, by the computer system, each respective speech segment based on the identified respective speaker information associated with the respective speech segment wherein the identified respective speaker information is based on the source indication information.

In exemplary embodiments, at least some of the visual content shows lips in the process of speaking and at least some other of the visual content shows lips not in the process of speaking and the source indication information includes an indication of whether lips are moving. In exemplary embodiments, at least some of the at least a portion of the video feed provided as input is a video segment showing lips of at least one participant among the plurality of participants. In exemplary embodiments, at least some of the at least one portion of the video feed provided as input is a set of a plurality of images separated by an interval of time from each other showing lips of at least one participant.

In exemplary embodiments, at least some of the visual content shows an artificial visual representation that speaking is occurring displayed on a screen of a user by teleconferencing software and at least some of the visual content shows at least a portion of a screen of a user displayed by the teleconferencing software lacking an artificial visual representation that speaking is occurring, and the source indication information includes an indication of whether speaking is indicated by the teleconferencing software. In exemplary embodiments, the artificial visual representation is a colored shape appearing around a designated portion of the screen. In exemplary embodiments, the artificial visual representation is predesignated text.

In exemplary embodiments, at least some of the at least a portion of the video feed provided as input shows a visual representation of characters associated with at least one participant among the plurality of participants displayed by teleconferencing software, at least some of the visual content shows characters, and the source information includes an indication of a name.

In exemplary embodiments, at least some of the at least a portion of the video feed provided as input shows a visual representation of characters associated with at least one participant among the plurality of participants displayed by teleconferencing software, at least some of the visual content shows characters, and the source information includes an indication of a phone number.

In exemplary embodiments, at least some of the at least a portion of the video feed provided as input shows a visual representation of characters associated with at least one participant among the plurality of participants displayed by teleconferencing software, at least some of the visual content shows characters, and the source information includes an indication of whether or not characters correspond to a name.

In exemplary embodiments, the step of identifying respective speaker information is further based on a look-up, by the computer system, of the output source indication information in a database containing speaker identification information associated with a plurality of potential speakers. In exemplary embodiments, the look-up, by the computer system, is performed using a customer relationship management system. In exemplary embodiments, the look-up, by the computer system, is performed based on comparison with individuals associated with an electronic invitation.

In exemplary embodiments, the step of identifying respective speaker information further uses a second neural network with the at least a portion of the video feed corresponding in time to the at least a portion of the segmented transcription data set determined according to the indexing as an input, and second source indication information as an output and a second training set including second visual content tagged with prior source indication information. In exemplary embodiments, at least some of the visual content shows lips and at least some other of the visual content shows an absence of lips and the source indication information includes an indication of whether lips are present. In exemplary embodiments, at least some of the second visual content shows lips in the process of speaking and at least some other of the second visual content shows lips not in the process of speaking and the second source indication information includes an indication of whether lips are speaking, the identifying of respective speaker information selectively occurring accordingly to whether both the source indication information as outputted indicates lips being present and the second source indication information as outputted indicates lips are speaking.

In exemplary embodiments, at least some of the visual content shows a face of a participant among the plurality of participants and at least some other of the visual content shows a face of a second individual and the source indication information includes an indication of an identity.

In exemplary embodiments, at least some of the at least a portion of the video feed provided as input shows a face or portion of a face of at least one participant among the plurality of participants, at least some of the visual content shows a facial feature of the at least one participant and at least some other of the visual content shows a facial feature of a second individual and the source indication information includes an indication of an identity. In exemplary embodiments, the face or portion of a face is a portion of a face and the at least some of the at least a portion of the video feed provided as input is filtered by one or more computer vision filters of the computer system such that the portion of a face corresponds in facial location to the facial feature.

In exemplary embodiments, at least some of the visual content shows lips in the process of pronouncing a first sound and at least some other of the visual content shows lips in the process of pronouncing a second sound and the source indication information includes an indication of a particular sound being pronounced. In exemplary embodiments, the step of identifying respective speaker information is further based on a comparison of the indication of the particular sound being pronounced as outputted by the neural network and sound in the audio component. In exemplary embodiments, the computer system selectively confirms or updates the transcription data based on the indication of the particular sound being pronounced as outputted by the neural network.

In exemplary embodiments, the teleconference metadata is generated by the computer system.

In exemplary embodiments, the transcription data is generated by the computer system.

In exemplary embodiments, the neural network is an artificial neural network.

In exemplary embodiments, the neural network is a deep neural network. In exemplary embodiments, the deep neural network has at least one convolutional neural network layer.

In exemplary embodiments, the neural network has a transformer architecture and includes an attention mechanism.

In exemplary embodiments, the training set further includes data regarding at least one participant among the plurality of participants.

In exemplary embodiments, the first recorded teleconference is a streaming teleconference.

In exemplary embodiments, the respective speaker identification information associated with at least one of the respective timestamp information identifies an absence of any speakers.

In exemplary embodiments, the respective speaker identification information associated with at least one of the respective timestamp information identifies one speaker among the plurality of participants.

In exemplary embodiments, the respective speaker identification information associated with at least one of the respective timestamp information identifies multiple speakers among the plurality of participants. In exemplary embodiments, the neural network is selectively used for the identifying the respective speaker information associated with a respective speech segment according to whether respective speaker identification information of the teleconference metadata identifies multiple speakers among the plurality of participants.

In exemplary embodiments, at least one of the first plurality of timestamp information includes a single timestamp.

In exemplary embodiments, at least one of the first plurality of timestamp information includes a commencing timestamp associated with a concluding timestamp.

In exemplary embodiments, the step of identifying respective speaker information associated with respective speech segments further includes identifying a participant from among the plurality of participants based on a unique identification of the participant in the source indication.

In exemplary embodiments, the step of identifying respective speaker information associated with respective speech segments further includes identifying a participant from among the plurality of participants based on additional processing using as an input a characteristic of the participant in the source indication that is not a unique identification of the participant.

In exemplary embodiments, the step of identifying, by the computer system, the respective speaker information associated with respective speech segments further involves performing optical character recognition on at least a portion of the video feed corresponding in time to at least a portion of the segmented transcription data set determined according to the indexing, so as to determine source-indicative characters or text.

In exemplary embodiments, identifying, by the computer system, the respective speaker information associated with respective speech segments further involves performing symbol recognition on at least a portion of the video feed corresponding in time to at least a portion of the segmented transcription data set determined according to the indexing, so as to determine whether a source-indicative colored shape appears around a designated portion of a display associated with the video feed.

In exemplary embodiments, the method further includes performing an analysis, by the computer system, of the diarization of the first recorded teleconference, and providing, by the computer system, results of such analysis to a user. In exemplary embodiments, the analysis, by the computer system, of the diarization of the first recorded teleconference, includes a determination of conversation participant talk times, a determination of conversation participant talk ratios, a determination of conversation participant longest monologues, a determination of conversation participant longest uninterrupted speech segments, a determination of conversation participant interactivity, a determination of conversation participant patience, a determination of conversation participant question rates, or a determination of a topic duration. In exemplary embodiments the analysis, by the computer system, of the diarization of the first recorded teleconference, includes a determination by at least one tracker of a frequency with which predetermined key words are mentioned by conversation participants.

In exemplary embodiments, there is a method for using video content of a video stream of a first recorded teleconference among a plurality of participants to diarize speech, the method involving: (a) obtaining, by a computer system, components of the first recorded teleconference among the plurality of participants conducted over a network, the respective components including: (1) an audio component including utterances of respective participants that spoke during the first recorded teleconference; (2) a video component including a video feed including video of respective participants that spoke during the first recorded teleconference; (3) teleconference metadata associated with the first recorded teleconference and including a first plurality of timestamp information and respective speaker identification information associated with each respective timestamp information; (4) transcription data associated with the first recorded teleconference, the transcription data being indexed by timestamps; (b) parsing, by the computer system, the audio component into a plurality of speech segments in which one or more participants were speaking during the first recorded teleconference, each respective speech segment being associated with a respective time segment including a start timestamp indicating a first time in the first recorded telephone conference when the respective speech segment begins, and a stop timestamp associated with a second time in the first recorded telephone conference when the respective speech segment ends; (c) tagging, by the computer system, each respective speech segment with the respective speaker identification information based on the teleconference metadata associated with the respective time segment; and (d) diarizing the first recorded teleconference, by the computer system, in a process involving: (1) indexing, by the computer system, the transcription data in accordance with respective speech segments and the respective speaker identification information to generate a segmented transcription data set for the first recorded teleconference; (2) identifying, by the computer system, respective speaker information associated with respective speech segments using a neural network with at least a portion of the video feed including video of at least one participant among the respective participants corresponding in time to at least a portion of the segmented transcription data set determined according to the indexing as an input, and a source indication as an output and a training set including a plurality of videos of persons tagged with indications of whether the respective persons are speaking; and (3) labeling, by the computer system, each respective speech segment based on the identified respective speaker information associated with the respective speech segment.

In exemplary embodiments, there is a method for using video content of a video stream of a first recorded teleconference among a plurality of participants to diarize speech, the method involving: (a) obtaining, by a computer system, components of the first recorded teleconference among the plurality of participants conducted over a network, the respective components including: (1) an audio component including utterances of respective participants that spoke during the first recorded teleconference; (2) a video component including a video feed including video of respective participants that spoke during the first recorded teleconference; (3) teleconference metadata associated with the first recorded teleconference and including a first plurality of timestamp information and respective speaker identification information associated with each respective timestamp information; (4) transcription data associated with the first recorded teleconference, said transcription data being indexed by timestamps; (b) parsing, by the computer system, the audio component into a plurality of speech segments in which one or more participants were speaking during the first recorded teleconference, each respective speech segment being associated with a respective time segment including a start timestamp indicating a first time in the first recorded telephone conference when the respective speech segment begins, and a stop timestamp associated with a second time in the first recorded telephone conference when the respective speech segment ends; (c) tagging, by the computer system, each respective speech segment with the respective speaker identification information based on the teleconference metadata associated with the respective time segment; and (d) diarizing the first recorded teleconference, by the computer system, in a process involving: (1) indexing, by the computer system, the transcription data in accordance with respective speech segments and the respective speaker identification information to generate a segmented transcription data set for the first recorded teleconference; (2) identifying, by the computer system, respective spoken dialogue information associated with respective speech segments using a neural network with at least a portion of the video feed including video of at least one participant among the respective participants corresponding in time to at least a portion of the segmented transcription data set determined according to the indexing as an input, and spoken dialogue indication information as an output and a training set including a plurality of videos of persons tagged with indications of what spoken dialogue the respective persons are speaking; and (3) updating, by the computer system, the transcription data based on the identified respective spoken dialogue information associated with the respective speech segment.

In exemplary embodiments, the step of identifying respective spoken dialogue associated with respective speech segments further includes identifying the spoken dialogue as dialogue in the spoken dialogue indication.

In exemplary embodiments, the step of identifying respective spoken dialogue associated with respective speech segments further includes identifying spoken dialogue based on additional processing using as an input the spoken dialogue indication. In exemplary embodiments, the additional processing involves a comparison of the spoken dialogue indication and the transcription data.

In exemplary embodiments, there is a method for using visual information in a video stream of a first recorded teleconference among a plurality of participants to diarize speech, the method involving: (a) obtaining, by a computer system, components of the first recorded teleconference among the plurality of participants conducted over a network, the respective components including: (1) an audio component including utterances of respective participants that spoke during the first recorded teleconference; (2) a video component including a video feed as to respective participants that spoke during the first recorded teleconference; (3) teleconference metadata associated with the first recorded teleconference and including a first plurality of timestamp information and respective speaker identification information associated with each respective timestamp information; (4) transcription data associated with the first recorded teleconference, the transcription data being indexed by timestamps; (b) parsing, by the computer system, the audio component into a plurality of speech segments in which one or more participants were speaking during the first recorded teleconference, each respective speech segment being associated with a respective time segment including a start timestamp indicating a first time in the first recorded telephone conference when the respective speech segment begins, and a stop timestamp associated with a second time in the first recorded telephone conference when the respective speech segment ends; (c) tagging, by the computer system, each respective speech segment with the respective speaker identification information based on the teleconference metadata associated with the respective time segment; and (d) diarizing the first recorded teleconference, by the computer system, in a process involving: (1) indexing, by the computer system, the transcription data in accordance with respective speech segments and the respective speaker identification information to generate a segmented transcription data set for the first recorded teleconference; (2) identifying, by the computer system, respective speaker information associated with respective speech segments by: (a) determining, in at least a portion of the video feed corresponding in time to at least a portion of the segmented transcription data set determined according to the indexing, a location of lips; (b) determining whether, at the determined location of lips in the least a portion of the video feed and based on comparison of two or more images separated in time, the lips are moving; (c) determining a source indication based on whether the lips are moving; and (d) identifying the respective speaker information associated with respective speech segments based on the source indication; and (3) labeling, by the computer system, each respective speech segment based on the identified respective speaker information associated with the respective speech segment.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method for using visual information in a video stream of a first recorded teleconference among a plurality of participants to diarize speech, the method comprising:
    (a) obtaining, by a computer system, components of the first recorded teleconference among the plurality of participants conducted over a network, wherein the respective components include:
        (i) an audio component including utterances of respective participants that spoke during the first recorded teleconference;
        (ii) a video component including a video feed as to respective participants that spoke during the first recorded teleconference;
        (iii) teleconference metadata associated with the first recorded teleconference and including a first plurality of timestamp information and respective speaker identification information associated with each respective timestamp information; and
        (iv) transcription data associated with the first recorded teleconference, wherein said transcription data is indexed by timestamps;
    (b) parsing, by the computer system, the audio component into a plurality of speech segments in which one or more participants were speaking during the first recorded teleconference, wherein each respective speech segment is associated with a respective time segment including a start timestamp indicating a first time in the first recorded teleconference when the respective speech segment begins, and a stop timestamp associated with a second time in the first recorded teleconference when the respective speech segment ends;
    (c) tagging, by the computer system, each respective speech segment with the respective speaker identification information based on the teleconference metadata associated with the respective time segment; and
    (d) diarizing, by the computer system, the first recorded teleconference in a process comprising:
        (i) indexing the transcription data in accordance with respective speech segments and the respective speaker identification information to generate a segmented transcription data set for the first recorded teleconference;
        (ii) identifying respective speaker information associated with respective speech segments using a neural network with at least a portion of the video feed corresponding in time to at least a portion of the segmented transcription data set determined according to the indexing as an input, and providing source indication information for each respective speech segment as an output and using a training set including visual content tagged with prior source indication information, wherein the portion of the video feed includes a first artificial visual representation not including a face generated by telephone conferencing software in the visual content associated with a first participant that spoke during a first speech segment of the first recorded teleconference, and the portion of the video feed does not include any artificial visual representation associated with a second participant that did not speak during the first speech segment of the recorded teleconference, and the source indication information is based at least on presence of the first artificial visual representation; and
        (iii) labeling each respective speech segment based on the identified respective speaker information associated with the respective speech segment;
            wherein the identified respective speaker information is based on the source indication information.

2. The method of claim 1, wherein at least some of the visual content shows lips in the process of speaking and at least some other of the visual content shows lips not in the process of speaking and the source indication information includes an indication of whether lips are moving.

3. The method of claim 1, wherein the artificial visual representation is a colored shape appearing around a designated portion of a screen.

4. The method of claim 1, wherein the artificial visual representation is predesignated text.

5. The method of claim 1, wherein the step of identifying respective speaker information is further based on a look-up, by the computer system, of the output source indication information in a database containing speaker identification information associated with a plurality of potential speakers.

6. The method of claim 5, wherein the look-up, by the computer system, is performed using a customer relationship management system.

7. The method of claim 1, wherein the step of identifying respective speaker information further uses a second neural network with the at least a portion of the video feed corresponding in time to the at least a portion of the segmented transcription data set determined according to the indexing as an input, and second source indication information as an output and a second training set including second visual content tagged with prior source indication information.

8. The method of claim 7, wherein at least some of the visual content shows lips and at least some other of the visual content shows an absence of lips and the source indication information includes an indication of whether lips are present.

9. The method of claim 8, wherein at least some of the second visual content shows lips in the process of speaking and at least some other of the second visual content shows lips not in the process of speaking and the second source indication information includes an indication of whether lips are speaking, and wherein the identifying of respective speaker information selectively occurs accordingly to whether both the source indication information as outputted indicates lips being present and the second source indication information as outputted indicates lips are speaking.

10. The method of claim 1, wherein at least some of the visual content shows lips in the process of pronouncing a first sound and at least some other of the visual content shows lips in the process of pronouncing a second sound and the source indication information includes an indication of a particular sound being pronounced.

11. The method of claim 1, wherein the teleconference metadata is generated by the computer system.

12. The method of claim 1, wherein the transcription data is generated by the computer system.

13. The method of claim 1, wherein the respective speaker identification information associated with at least one of the respective timestamp information identifies multiple speakers among the plurality of participants.

14. The method of claim 13, wherein the neural network is selectively used for the identifying the respective speaker information associated with respective speech segments according to whether respective speaker identification information of the teleconference metadata identifies multiple speakers among the plurality of participants.

15. The method of claim 1, wherein identifying, by the computer system, the respective speaker information associated with respective speech segments further comprises performing optical character recognition on at least a portion of the video feed corresponding in time to at least a portion of the segmented transcription data set determined according to the indexing, so as to determine source-indicative characters or text.

16. The method of claim 1, wherein identifying, by the computer system, the respective speaker information associated with respective speech segments further comprises performing symbol recognition on at least a portion of the video feed corresponding in time to at least a portion of the segmented transcription data set determined according to the indexing, so as to determine whether a source-indicative colored shape appears around a designated portion of a display associated with the video feed.

17. The method of claim 1, further comprising performing an analysis, by the computer system, of the diarization of the first recorded teleconference, and providing, by the computer system, results of such analysis to a user.

18. The method of claim 17, wherein the analysis, by the computer system, of the diarization of the first recorded teleconference, comprises a determination of conversation participant talk times, a determination of conversation participant talk ratios, a determination of conversation participant longest monologues, a determination of conversation participant longest uninterrupted speech segments, a determination of conversation participant interactivity, a determination of conversation participant patience, a determination of conversation participant question rates, or a determination of a topic duration.

19. A method for using video content of a video stream of a first recorded teleconference among a plurality of participants to diarize speech, the method comprising:
(a) obtaining, by a computer system, components of the first recorded teleconference among the plurality of participants conducted over a network, wherein the components include:
(i) an audio component including utterances of respective participants that spoke during the first recorded teleconference;
(ii) a video component including a video feed comprising video of respective participants that spoke during the first recorded teleconference;
(iii) teleconference metadata associated with the first recorded teleconference and including a first plurality of timestamp information and respective speaker identification information associated with each respective timestamp information; and
(iv) transcription data associated with the first recorded teleconference, wherein said transcription data is indexed by timestamps;
(b) parsing, by the computer system, the audio component into a plurality of speech segments in which one or more participants were speaking during the first recorded teleconference, wherein each respective speech segment is associated with a respective time segment including a start timestamp indicating a first time in the first recorded teleconference when the respective speech segment begins, and a stop timestamp associated with a second time in the first recorded teleconference when the respective speech segment ends;
(c) tagging, by the computer system, each respective speech segment with the respective speaker identification information based on the teleconference metadata associated with the respective time segment; and
(d) diarizing, by the computer system, the first recorded teleconference in a process comprising:
(i) indexing the transcription data in accordance with respective speech segments and the respective speaker identification information to generate a segmented transcription data set for the first recorded teleconference;
(ii) identifying respective spoken dialogue information associated with respective speech segments using a neural network with at least a portion of the video feed comprising video of at least one participant among the respective participants corresponding in time to at least a portion of the segmented transcription data set determined according to the indexing as an input, and spoken dialogue indication information as an output and a training set including a plurality of videos of persons tagged with indications of what spoken dialogue the respective persons are speaking, wherein the portion of the video feed includes a first artificial visual representation not including a face generated by telephone conferencing software in the visual content associated with a first participant that spoke during a first speech segment of the first recorded teleconference, and the portion of the video feed does not include any artificial visual representation associated with a second participant that did not speak during the first speech segment of the recorded teleconference, and the speaker identification information is based at least on presence of the first artificial visual representation; and,
(iii) updating the transcription data based on the identified respective spoken dialogue information associated with the respective speech segment.

\* \* \* \* \*